(12) United States Patent
Reinhard et al.

(10) Patent No.: US 11,330,820 B2
(45) Date of Patent: May 17, 2022

(54) PESTICIDALLY ACTIVE MIXTURES

(71) Applicant: BASF Agrochemical Products B.V., Arnhem (NL)

(72) Inventors: Robert Reinhard, Limburgerhof (DE); Tatjana Sikuljak, Mannheim (DE); Pascal Bindschaedler, Roemerberg (DE); Karsten Koerber, Eppelheim (DE); Juergen Langewald, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/317,300

(22) PCT Filed: Jul. 6, 2017

(86) PCT No.: PCT/EP2017/066975
§ 371 (c)(1),
(2) Date: Jan. 11, 2019

(87) PCT Pub. No.: WO2018/011056
PCT Pub. Date: Jan. 18, 2018

(65) Prior Publication Data
US 2019/0230926 A1    Aug. 1, 2019

(30) Foreign Application Priority Data

Jul. 12, 2016 (EP) .................... 16179088

(51) Int. Cl.
| | | |
|---|---|---|
| A01N 43/56 | (2006.01) | |
| A01N 37/22 | (2006.01) | |
| A01N 37/46 | (2006.01) | |
| A01N 33/06 | (2006.01) | |
| A01N 43/80 | (2006.01) | |
| A01N 43/90 | (2006.01) | |

(52) U.S. Cl.
CPC ............. *A01N 43/56* (2013.01); *A01N 33/06* (2013.01); *A01N 37/22* (2013.01); *A01N 37/46* (2013.01); *A01N 43/80* (2013.01); *A01N 43/90* (2013.01)

(58) Field of Classification Search
CPC ........ A01N 37/46; A01N 43/80; A01N 43/40; A01N 43/54; A01N 43/90; A01N 43/48; A01N 33/06; A01N 47/06; A01N 43/56; A01N 37/22
See application file for complete search history.

(56) References Cited

U.S. PATENT DOCUMENTS

| | | |
|---|---|---|
| 2011/0301031 A1 | 12/2011 | Muehlebach et al. |
| 2011/0301181 A1 | 12/2011 | Maue et al. |
| 2014/0213448 A1 | 7/2014 | Buysse et al. |
| 2015/0368249 A1 | 12/2015 | Ochi et al. |

FOREIGN PATENT DOCUMENTS

| | | |
|---|---|---|
| EP | 2910126 A1 | 8/2015 |
| EP | 2910126 A1 | 8/2015 |
| EP | 3028573 A1 | 6/2016 |
| JP | 2012-507482 A | 3/2012 |
| JP | 2012-511541 A | 5/2012 |
| WO | 2010018857 A1 | 2/2010 |
| WO | WO-2010/018857 A1 | 2/2010 |
| WO | 2011105506 A1 | 9/2011 |

(Continued)

OTHER PUBLICATIONS

International Search Report for International Application No. PCT/EP2017/066975, dated Oct. 23, 2017, 6 pages.

(Continued)

*Primary Examiner* — Blessing M Fubara
(74) *Attorney, Agent, or Firm* — Marshall, Gerstein & Borun LLP

(57) ABSTRACT

Pesticidal mixtures including a pesticidally active compound I selected from:
a) compound a) of formula (I).

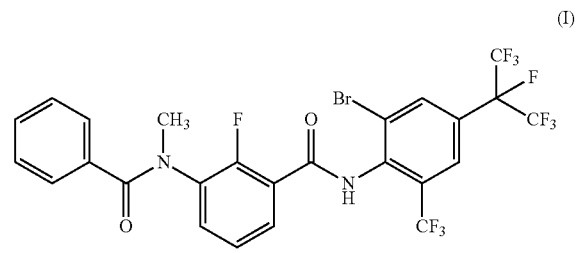

b) compound b) of formula (Ia),

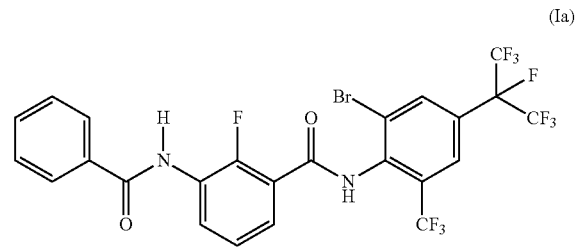

c) mixtures comprising compounds a) and b),
and at least one further pesticidal active ingredient are disclosed. Methods and use of these mixtures for combating and controlling insects, acarids or nematodes in and on plants, and for protecting such plants being infested with pests are disclosed.

16 Claims, No Drawings

(56) References Cited

FOREIGN PATENT DOCUMENTS

| | | |
|---|---|---|
| WO | WO-2011/105506 A1 | 9/2011 |
| WO | 2012126766 A1 | 9/2012 |
| WO | WO-2012/126766 A1 | 9/2012 |
| WO | 2012163960 A1 | 12/2012 |
| WO | WO-2012/163948 A1 | 12/2012 |
| WO | WO-2012/163960 A1 | 12/2012 |
| WO | WO 2012163960 * | 12/2012 |
| WO | 2013050302 A1 | 4/2013 |
| WO | WO-2013/050302 A1 | 4/2013 |
| WO | WO-2014/029640 A1 | 2/2014 |
| WO | 2014187847 A1 | 11/2014 |
| WO | WO-2014/187847 A1 | 11/2014 |
| WO | 2014191271 A1 | 12/2014 |
| WO | WO-2014/191271 A1 | 12/2014 |
| WO | 2015038503 A1 | 3/2015 |
| WO | WO-2015/038503 A1 | 3/2015 |
| WO | 2015055752 A1 | 4/2015 |
| WO | 2015059039 A1 | 4/2015 |
| WO | WO-2015/055752 A1 | 4/2015 |
| WO | WO-2015/055757 A1 | 4/2015 |
| WO | WO-2015/059039 A1 | 4/2015 |
| WO | WO 2015055752 A1 * | 4/2015 |
| WO | 2015132140 A1 | 9/2015 |
| WO | WO-2015/132140 A1 | 9/2015 |
| WO | 2015190316 A1 | 12/2015 |
| WO | WO-2015/190316 A1 | 12/2015 |
| WO | 2016104516 A1 | 6/2016 |
| WO | WO-2016/104516 A1 | 6/2016 |
| WO | 2016174049 A1 | 11/2016 |
| WO | WO-2016/174049 A1 | 11/2016 |
| WO | 2017011288 A1 | 1/2017 |

OTHER PUBLICATIONS

Written Opinion of the International Search Authority for International Application No. PCT/EP2017/066975, dated Oct. 23, 2017, 9 pages.

International Search Report for PCT Patent Application No. PCT/EP2017/066975, dated Oct. 23, 2017, 4 pages.

* cited by examiner

PESTICIDALLY ACTIVE MIXTURES

CROSS-REFERENCE TO RELATED APPLICATIONS

This application is a U.S. National Phase Application of PCT/EP2017/066975, filed Jul. 6, 2017, which claims the benefit of priority to EP Application No. 16179088.6, filed Jul. 12, 2016, the contents of which are hereby expressly incorporated by reference in their entirety.

The present invention relates to mixtures of active ingredients having synergistically enhanced action and to methods comprising applying said mixtures.

The present invention relates to pesticidal mixtures comprising as active compounds
1) at least one compound I selected from
   a) compound a) of formula (I)

(I)

b) compound b) of formula (Ia)

(Ia)

and c) mixtures comprising compounds a) and b),
   or the tautomers, enantiomers, diastereomers, or salts thereof; and
2) one or more pesticidally active compounds II selected from the group of 2.1. a compound of formula II.1

(II.1)

2.2. a compound of formula II.2

(II.2)

| | $R^{II.2.1a}$ | $R^{II.2.1b}$ |
|---|---|---|
| II.2-1 | H | $CH_3$ |
| II.2-2 | H | Cl |
| II.2-3 | $CH_3$ | Cl |
| II.2-4 | $CH_3$ | $CH_3$ |
| II.2-5 | $O-CH_2CH_3$ | $CH_3$ |
| II.2-6 | $O-CH_3$ | $CH_3$ |
| II.2-7 | $O-CH_3$ | Cl |
| II.2-8 | $O-CH_2CH_3$ | Cl |

2.3. a compound of formula II.3-1 or II.3-2

(II.3-1)

(II.3-2)

2.4. a compound of formula II.4-1 or II-4.2

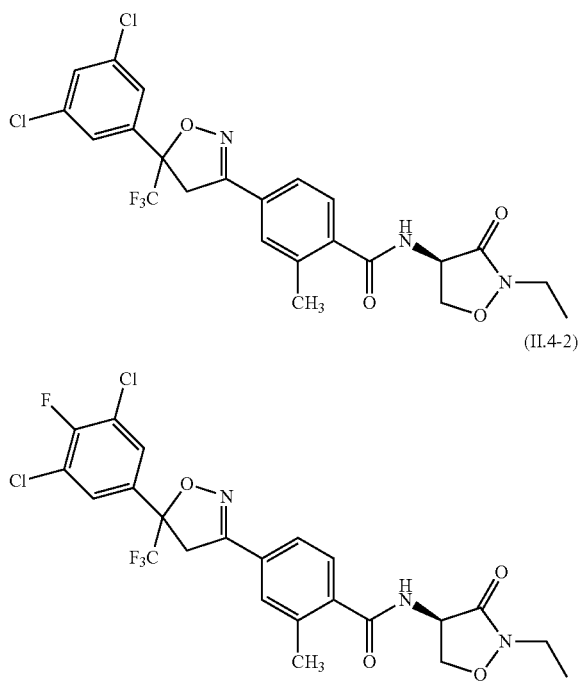

2.5. a compound of formula II.5

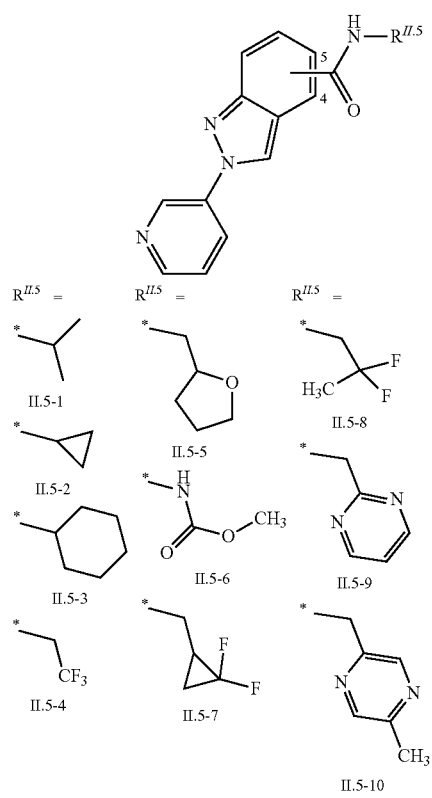

wherein the moiety —C(O)NHR$^{II.5}$ in compounds II.5-1 to II.5-4 is connected to position 4 of the indazole moiety and wherein the moiety —C(O)NHR$^{II.5}$ in compounds II.5-5 to II.5-10 is connected to position 5 of the indazole moiety;

2.6. a compound of formula II.6

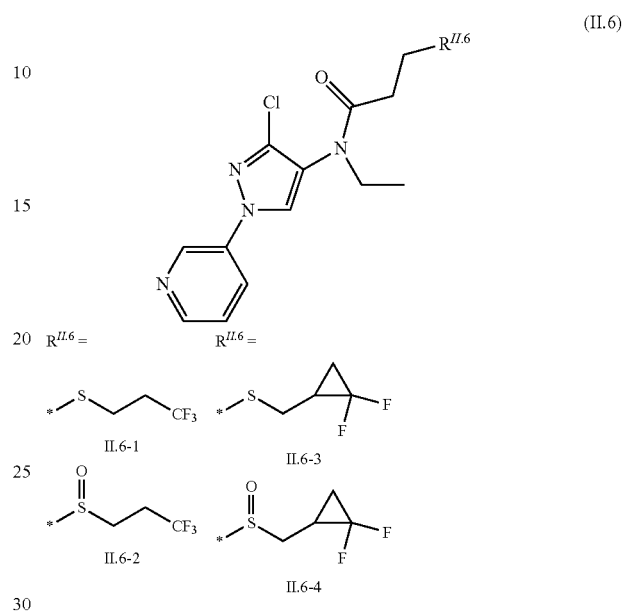

2.7. compound II.7 N-[4-chloro-3-(cyclopropylcarbamoyl)phenyl]-2-methyl-5-(1,1,2,2,2-pentafluoroethyl)-4-(trifluoromethyl)pyrazole-3-carboxamide;

2.8. compound II.8 N-[4-chloro-3-[(1-cyanocyclopropyl)carbamoyl]phenyl]-2-methyl-5-(1,1,2,2,2-pentafluoroethyl)-4-(trifluoromethyl)pyrazole-3-carboxamide;

2.9. compound II.9 acynonapyr;

2.10. compound II.10 benzpyrimoxan;

2.11 compound II.11 2-chloro-N-(1-cyanocyclopropyl)-5-[1-[2-methyl-5-(1,1,2,2,2-pentafluoroethyl)-4-(trifluoromethyppyrazol-3-yl]pyrazol-4-yl]benzamide;

in a pesticidally effective amount.

The asterisk "*" denotes the bond in the group, which forms the connection to the rest of the molecule.

In a preferred embodiment, the invention relates to pesticidal mixtures comprising as active compounds at least one compound I selected from compound a), compound b), and mixtures comprising a) and b) and at least one compound II as defined above, in synergisticaly effective amounts.

Preferred as compound I is compound a) of formula (I). Compound a) of formula (I) is also known as broflanilide.

One typical problem arising in the field of pest control lies in the need to reduce the dosage rates of the active ingredient in order to reduce or avoid unfavorable environmental or toxicological effects whilst still allowing effective pest control.

Another problem encountered concerns the need to have available pest control agents which are effective against a broad spectrum of pests.

There also exists the need for pest control agents that combine knock-down activity with prolonged control, that is, fast action with long lasting action.

Another difficulty in relation to the use of pesticides is that the repeated and exclusive application of an individual pesticidal compound leads in many cases to a rapid selection of pests which have developed natural or adapted resistance against the active compound in question.

Therefore there is a need for pest control agents that help prevent or overcome resistance induced by pesticides.

Furthermore, there is a desire for pesticide compounds or combination of compounds, which when applied improve plants, which may result in "plant health", "vitality of plant propagation material" or "increased plant yield".

It is therefore an object of the present invention to provide agricultural combinations which solves one or more than one of the discussed problems as
reducing the dosage rate,
enhancing the spectrum of activity,
combining knock-down activity with prolonged control,
improving resistance management,
Improved plant health;
Improved vitality of plant propagation material, also termed seed vitality;
Increased plant yield.

It was therefore an object of the present invention to provide pesticidal mixtures which solve at least one of the discussed problems as reducing the dosage rate, enhancing the spectrum of activity or combining knock-down activity with prolonged control or as to resistance management.

It has been found that this object is in part or in whole achieved by the combination of active compounds as defined herein.

As used herein, the term "mixture(s) of the present invention" or "mixture(s) according to the invention" refers to the mixtures comprising
compound I selected from compound a) of formula (I), compound b) of formula (Ia), and mixtures comprising compounds a) and b) as defined above, which are also referred to as "compound(s) I", and
compound(s) of formula (II) as defined above, i.e. compounds of formula (II.1), (II.2), (II.3.), (II.4), (II.5), (II.6), or compounds II.7, II.8, II.9, II.10, or II.11, which are also referred to as "compound(s) of formula II" or "compound(s) II".

The compounds I and the compounds II are understood to include their salts, tautomers, stereoisomers, and N-oxides.

The present invention relates to a mixture of at least one compound I of the present invention, preferably compound a) of formula (I), with at least one mixing partner II as defined above. In one embodiment, the invention relates to binary mixtures of one compound I with one mixing partner II as defined above as compound II.

Preferred weight ratios for such binary mixtures are from 5000:1 to 1:5000, preferably from 1000:1 to 1:1000, more preferably from 100:1 to 1:100, particularly preferably from 10:1 to 1:10. In such binary mixtures, compounds I and II may be used in equal amounts, or an excess of compound I, or an excess of compound II may be used.

In the mixtures of the present invention, the ingredients may be used sequentially or in combination with each other, if appropriate also added only immediately prior to use (tank mix). For example, the plant(s) may be sprayed with compound II either before or after being treated with compound I.

Depending on the substitution pattern, the compounds of the present invention may have one or more centers of chirality, in which case they are present as mixtures of enantiomers or diastereomers. The invention provides both the pure enantiomers or pure diastereomers of the compounds of the present invention, and their mixtures and the use according to the invention of the pure enantiomers or pure diastereomers of the compounds of the present invention or their mixtures. Suitable compounds of the formula of the present invention also include all possible geometrical stereoisomers (cis/trans isomers) and mixtures thereof. Cis/trans isomers may be present with respect to an alkene, carbon-nitrogen double-bond, nitrogen-sulfur double bond or amide group. The term "stereoisomer(s)" encompasses both optical isomers, such as enantiomers or diastereomers, the latter existing due to more than one center of chirality in the molecule, as well as geometrical isomers (cis/trans isomers).

Salts of the compounds of the present invention are preferably agriculturally and veterinarily acceptable salts. They can be formed in a customary method, e.g. by reacting the compound with an acid if the compound of the present invention has a basic functionality or by reacting the compound with a suitable base if the compound of the present invention has an acidic functionality.

In general, suitable "agriculturally useful salts" or "agriculturally acceptable salts" are especially the salts of those cations or the acid addition salts of those acids whose cations and anions, respectively, do not have any adverse effect on the action of the compounds according to the present invention. Suitable cations are in particular the ions of the alkali metals, preferably lithium, sodium and potassium, of the alkaline earth metals, preferably calcium, magnesium and barium, and of the transition metals, preferably manganese, copper, zinc and iron, and also ammonium $(NH_4)^+$ and substituted ammonium in which one to four of the hydrogen atoms are replaced by $C_1$-$C_4$-alkyl, $C_1$-$C_4$-hydroxyalkyl, $C_1$-$C_4$-alkoxy, $C_1$-$C_4$-alkoxy-$C_1$-$C_4$-alkyl, hydroxy-$C_1$-$C_4$-alkoxy-$C_1$-$C_4$-alkyl, phenyl or benzyl. Examples of substituted ammonium ions comprise methylammonium, isopropylammonium, dimethylammonium, diisopropylammonium, trimethylammonium, tetramethylammonium, tetraethylammonium, tetrabutylammonium, 2-hydroxyethylammonium, 2-(2-hydroxyethoxy)ethyl-ammonium, bis(2-hydroxyethyl)ammonium, benzyltrimethylammonium and benzyltriethylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium.

Anions of useful acid addition salts are primarily chloride, bromide, fluoride, hydrogen sulfate, sulfate, dihydrogen phosphate, hydrogen phosphate, phosphate, nitrate, hydrogen carbonate, carbonate, hexafluorosilicate, hexafluorophosphate, benzoate, and the anions of $C_1$-$C_4$-alkanoic acids, preferably formate, acetate, propionate and butyrate. They can be formed by reacting the compounds of the formulae (I), (Ia) or (II) with an acid of the corresponding anion, preferably of hydrochloric acid, hydrobromic acid, sulfuric acid, phosphoric acid or nitric acid.

Preferred compounds of the present invention are compounds I, compounds II, compounds of formula (I), (Ia) or (II) or a stereoisomer, N-oxide or salt thereof, wherein the salt is an agriculturally or veterinarily acceptable salt.

The compounds of the present invention may be present in the form of their N-oxides. The term "N-oxide" includes any compound of the present invention which has at least one tertiary nitrogen atom that is oxidized to an N-oxide moiety. N-oxides of compounds of the present invention can in particular be prepared by oxidizing the ring nitrogen atom(s) of the pyridine ring and/or the pyrazole ring with a suitable oxidizing agent, such as peroxo carboxylic acids or other peroxides. The person skilled in the art knows if and in which positions compounds of the present invention, compounds I, compounds II, compounds of the formula (I), (Ia), or (II), may form N-oxides.

The compounds I of the present invention may be amorphous or may exist in one ore more different crystalline states (polymorphs) which may have different macroscopic properties such as stability or show different biological properties such as activities. The present invention includes both amorphous and crystalline compounds of formula (I), (Ia), their enantiomers or diastereomers, mixtures of different crystalline states of the respective compound of formula (I) and (Ia), their enantiomers or diastereomers, as well as amorphous or crystalline salts thereof.

The term "co-crystal" denotes a complex of the compounds of the present invention or a stereoisomer, salt, tautomer or N-oxide thereof, with one or more other molecules (preferably one molecule type), wherein usually the ratio of the compound according to the invention and the other molecule is a stoichiometric ratio.

The term "solvate" denotes a co-complex of the compounds of the present invention, or a stereoisomer, salt, tautomer or N-oxide thereof, with solvent molecules. The solvent is usually liquid. Examples of solvents are methanol, ethanol, toluol, xylol. A preferred solvent which forms solvates is water, which solvates are referred to as "hydrates". A solvate or hydrate is usually characterized by the presence of a fixed number of n molecules solvent per m molecules compound according to the invention.

Compounds I

Preparation of the compounds I, preferably compound a) of formula (I), can further be accomplished according to standard methods of organic chemistry, e.g. by the methods or working examples described in WO 2010/018857 without being limited to the routes given therein.

Agronomically acceptable salts of the compounds I can be formed in a customary manner, e.g. by reaction with an acid of the anion in question.

Compounds II

The compounds of formula (II) can be prepared as described in the literature.

The compound of formula II.1 (IUPAC name: N-[4-Chloro-3-[[(phenylmethyl)amino]carbonyl]phenyl]-1-methyl-3-(1,1,2,2,2-pentafluoroethyl)-4-(trifluoromethyl)-1H- pyrazole-5-carboxamide) is known from EP2910126. The compounds of formula II.2 are known from WO2014/191271 and WO2014/187847. The compounds of formula II.3, respectively II.3-1 (IU-PAC name: 2-(3-ethylsulfonyl-2-pyridyl)-3-methyl-6-(trifluoromethyl)imidazo[4,5-b]pyridine) and II.3-2 (IUPAC name: 2-[3-ethylsulfonyl-5-(trifluoromethyl)-2-pyridyl]-3-methyl-6-(trifluoromethyl) imidazo[4,5-b]pyridine) are known from WO2015/059039 and WO2015/190316. The compound of formula II.4-1 (IUPAC name: 4-[5-(3,5-dichlorophenyl)-5-(trifluoromethyl)-4H-isoxazol-3-yl]-N-[(4R)-2-ethyl-3-oxo-isoxazolidin-4-yl]-2-methyl-benzamide) and II-.4-2 (IUPAC name: 4-[5-(3,5-dichloro-4-fluorophenyl)-5-(trifluoromethyl)-4H-isoxazol-3-yl]-N-[(4R)-2-ethyl-3-oxo-isoxazolidin-4-yl]-2-methyl-benzamide) are known from WO2013/050302. The compounds of formula II.4-1 and II.4-2, in which the cycloserine has R-configuration but the isoxazoline moiety may vary, are present as pure stereoisomers or as mixtures thereof:

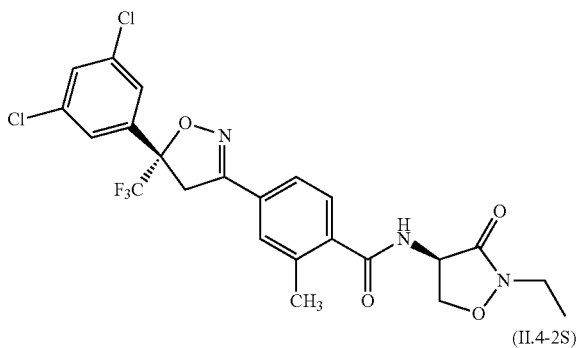

(II.4-1S)

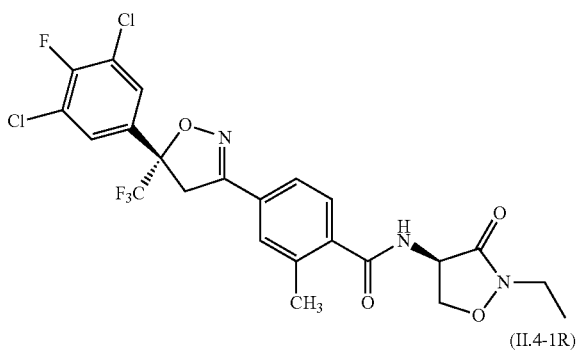

(II.4-2S)

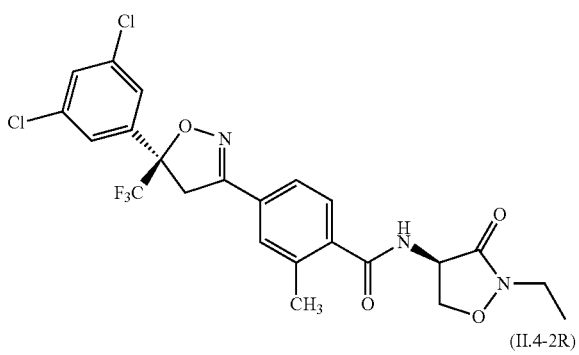

(II.4-1R)

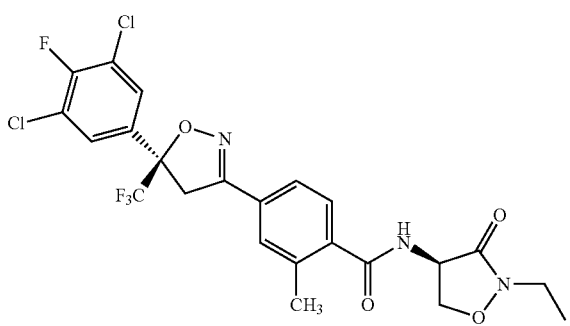

(II.4-2R)

Preferred are II.4-1S and II.4-2S.

The compounds of formula II.5 are known from WO2015/038503.

The compounds of formula II.6 are known from US2014/0213448.

Compound II.7 (N-[4-chloro-3-(cyclopropylcarbamoyl)phenyl]-2-methyl-5-(1,1,2,2,2-pentafluoroethyl)-4-(trifluoromethyl)pyrazole-3-carboxamide) and compound II.8 (N-[4-chloro-3-[(1-cyanocyclopropyl)carbamoyl]phenyl]-2- methyl-5-(1,1,2,2,2-pentafluoroethyl)-4-(trifluoromethyl) pyrazole-3-carboxamide) are known from WO 2012/126766;

Compound II.9 (Acynonapyr; (1R,5R)-3-[n2-propoxy-4-(trifluoromethyl)phenoxy]-9-[[5-(trifluoromethyl)-2-pyridyl]oxy]-9-azabicyclo[3.3.1]nonane) is known from WO 2011/105506.

Compound II.10 (Benzpyrimoxan; 5-(1,3-dioxan-2-yl)-4-[[4-(trifluoromethyl)phenyl]methoxy]pyrimidine) is known from WO 2016/104516.

Compound II.11 (2-chloro-N-(1-cyanocyclopropyl)-5-[1-[2-methyl-5-(1,1,2,2,2-pentafluoroethyl)-4-(trifluoromethyl)pyrazol-3-yl]pyrazol-4-yl]benzamide) is known from WO 2016/174049.

Preferences

In one embodiment, the invention relates to mixtures wherein in compound I is compound a) of formula (I).

In one embodiment, the invention relates to mixtures wherein in compound I is compound b) of formula (Ia).

In one embodiment, the invention relates to mixtures wherein in compound I is a mixture comprising compound a) of formula (I) and compound b) of formula (Ia).

In one embodiment, the invention relates to mixtures wherein compound I is compound a) of formula (I) and wherein compound II is compound II.1, II.2-1, II.2-2, II.2-3, II2-4, II.2-5, II.2-6, II.2-7II.2-8, II.3-1, II.3-2 or II.4-1, II.4-2, II.4-1S, II.4-1R, II.4-2S or II.4-2R, II.7, II.8, II.9, II.10, or II.11

In one embodiment, the invention relates to mixtures wherein compound I is compound b) of formula (Ia) and wherein compound II is compound II.1, II.2-1, II.2-2II.2-3II.2-4II.2-5, II.2-6, II.2-7, II.2-8, II.3-1, II.3-2 or II.4-1, II.4-2, II.4-1S, II.4-1R, II.4-2S or II.4-2R, II.7, II.8, II.9, II.10, or II.11

In one embodiment, the invention relates to mixtures wherein the component I is a mixture of compounds a) of formula (I) and b) of formula (Ia), and wherein compound II is compound II.1, II.2-1, II.2-2, II.2-3, II.2-4, II.2-5, II.2-6, II.2-7, II.2-8, II.3-1, II.3-2 or II.4-1, II.4-2, II.4-1S, II.4-1R, II.4-2S, or II.4-2R, II.7, II.8, II.9, II.10, or II.11.

In one embodiment, the invention relates to mixtures wherein compound I is compound a) of formula (I) and wherein compound II is compound II.2-1, II.2-2, II.2-3, II.2-4, II.2-5, II.2-6, II.2-7, II.2-8, II.3-1, II.3-2 or II.4-1, II.4-2, II.4-1S, II.4-1R, II.4-2S or II.4-2R, II.7, II.8, II.9, II.10, or II.11.

In one embodiment, the invention relates to mixtures wherein compound I is compound b) of formula (Ia) and wherein compound II is compound II.2-1, II.2-2, II.2-3, II.2-4, II.2-5, II.2-6, II.2-7, II.2-8, II.3-1, II.3-2 or II.4-1, II.4-2, II.4-1S, II.4-1R, II.4-2S or II.4-2R, II.7, II.8, II.9, II.10, or II.11.

In one embodiment, the invention relates to mixtures wherein compound I is a mixture of compounds a) of formula (I) and b) of formula (Ia), and wherein compound II is compound II.2-1, II.2-2, II.2-3, II.2-4, II.2-5, II.2-6, II.2-7, II.2-8, II.3-1, II.3-2 or II.4-1, II.4-2, II.4-1S, II.4-1R, II.4-2S or II.4-2R, II.7, II.8, II.9, II.10, or II.11.

In one embodiment, the invention relates to mixtures wherein compound II is compound II1.

In one embodiment, the invention relates to mixtures wherein compound II is compound II.2-1.

In one embodiment, the invention relates to mixtures wherein compound II is compound II.2-2.

In one embodiment, the invention relates to mixtures wherein compound II is compound II.2-3 (Spiropidion). In one embodiment, the invention relates to mixtures wherein compound II is compound II.2-4. In one embodiment, the invention relates to mixtures wherein compound II is compound II.2-5. In one embodiment, the invention relates to mixtures wherein compound II is compound II.2-6. In one embodiment, the invention relates to mixtures wherein compound II is compound II.2-7. In one embodiment, the invention relates to mixtures wherein compound II is compound II.2-8.

In one embodiment, the invention relates to mixtures wherein compound II is compound II.3-1.

In one embodiment, the invention relates to mixtures wherein compound II is compound II.3-2.

In one embodiment, the invention relates to mixtures wherein compound II is compound II.4-1.

In one embodiment, the invention relates to mixtures wherein compound II is compound II.4-2.

In one embodiment, the invention relates to mixtures wherein compound II is compound II.4-1S.

In one embodiment, the invention relates to mixtures wherein compound II is compound II.4-1R.

In one embodiment, the invention relates to mixtures wherein compound II is compound II.4-2S.

In one embodiment, the invention relates to mixtures wherein compound II is compound II.4-2R.

In one embodiment, the invention relates to mixtures wherein compound II is compound II.5-1, II.5-2, II.5-3, II.5-4, II.5-5, II.5-6, II.5-7, II.5-8, II.5-9, II.5-10, II.6-1, II.6-2, II.6-3 or II.6-4.

In one embodiment, the invention relates to mixtures wherein compound II is compound II.5-1, II.5-2, II.5-3 or II.5-4 (connected to position 4 of the indazole moiety). In another embodiment, the invention relates to mixtures wherein compound II is compound II.5-5, II.5-6, II.5-.7, II.5-8, II.5-9 or II.5-10 (connected to position 5 of the indazole moiety).

In one embodiment, the invention relates to mixtures wherein compound II is compound II.7.

In one embodiment, the invention relates to mixtures wherein compound II is compound II.8.

In one embodiment, the invention relates to mixtures wherein compound II is compound II.9.

In one embodiment, the invention relates to mixtures wherein compound II is compound II.10.

In one embodiment, the invention relates to mixtures wherein compound II is compound II.11.

In one embodiment, the invention relates to mixtures as set out in Table M.

TABLE M

| Mixture | Compound I | Compound II |
|---------|------------|-------------|
| M.1 | a) | II.1 |
| M.2 | a) | II.2-1 |
| M.3 | a) | II.2-2 |
| M.4 | a) | II.2-3 |
| M.5 | a) | II.2-4 |
| M.6 | a) | II.2-5 |
| M.7 | a) | II.2-6 |
| M.8 | a) | II.2-7 |
| M.9 | a) | II.2-8 |
| M.10 | a) | II.3-1 |
| M.11 | a) | II.3-2 |
| M.12 | a) | II.4-1 |
| M.13 | a) | II.4-2 |
| M.14 | a) | II.4-1S |

TABLE M-continued

| Mixture | Compound I | Compound II |
|---------|------------|-------------|
| M.15 | a) | II.4-2S |
| M.16 | a) | II.4-1R |
| M.17 | a) | II.4-2R |
| M.18 | a) | II.5-1 |
| M.19 | a) | II.5-2 |
| M.20 | a) | II.5-3 |
| M.21 | a) | II.5-4 |
| M.22 | a) | II.5-5 |
| M.23 | a) | II.5-6 |
| M.24 | a) | II.5-7 |
| M.25 | a) | II.5-8 |
| M.26 | a) | II.5-9 |
| M.27 | a) | II.5-10 |
| M.28 | a) | II.6-1 |
| M.29 | a) | II.6-2 |
| M.30 | a) | II.6-3 |
| M.31 | a) | II.6-4 |
| M.32 | a) | II.7 |
| M.33 | a) | II.8 |
| M.34 | a) | II.9 |
| M.35 | a) | II.10 |
| M.36 | a) | II.11 |
| M.37 | b) | II.1 |
| M.38 | b) | II.2-1 |
| M.39 | b) | II.2-2 |
| M.40 | b) | II.2-3 |
| M.41 | b) | II.2-4 |
| M.42 | b) | II.2-5 |
| M.43 | b) | II.2-6 |
| M.44 | b) | II.2-7 |
| M.45 | b) | II.2-8 |
| M.46 | b) | II.3-1 |
| M.47 | b) | II.3-2 |
| M.48 | b) | II.4-1 |
| M.49 | b) | II.4-2 |
| M.50 | b) | II.4-1S |
| M.51 | b) | II.4-2S |
| M.52 | b) | II.4-1R |
| M.53 | b) | II.4-2R |
| M.54 | b) | II.5-1 |
| M.55 | b) | II.5-2 |
| M.56 | b) | II.5-3 |
| M.57 | b) | II.5-4 |
| M.58 | b) | II.5-5 |
| M.59 | b) | II.5-6 |
| M.60 | b) | II.5-7 |
| M.61 | b) | II.5-8 |
| M.62 | b) | II.5-9 |
| M.63 | b) | II.5-10 |
| M.64 | b) | II.6-1 |
| M.65 | b) | II.6-2 |
| M.66 | b) | II.6-3 |
| M.67 | b) | II.6-4 |
| M.68 | b) | II.7 |
| M.69 | b) | II.8 |
| M.70 | b) | II.9 |
| M.71 | b) | II.10 |
| M.72 | b) | II.11 |
| M.73 | a) + b) | II.1 |
| M.74 | a) + b) | II.2-1 |
| M.75 | a) + b) | II.2-2 |
| M.76 | a) + b) | II.2-3 |
| M.77 | a) + b) | II.2-4 |
| M.78 | a) + b) | II.2-5 |
| M.79 | a) + b) | II.2-6 |
| M.80 | a) + b) | II.2-7 |
| M.81 | a) + b) | II.2-8 |
| M.82 | a) + b) | II.3-1 |
| M.83 | a) + b) | II.3-2 |
| M.84 | a) + b) | II.4-1 |
| M.85 | a) + b) | II.4-2 |
| M.86 | a) + b) | II.4-1S |
| M.87 | a) + b) | II.4-2S |
| M.88 | a) + b) | II.4-1R |
| M.89 | a) + b) | II.4-2R |
| M.90 | a) + b) | II.5-1 |
| M.91 | a) + b) | II.5-2 |
| M.92 | a) + b) | II.5-3 |
| M.93 | a) + b) | II.5-4 |
| M.94 | a) + b) | II.5-5 |
| M.95 | a) + b) | II.5-6 |
| M.96 | a) + b) | II.5-7 |
| M.97 | a) + b) | II.5-8 |
| M.98 | a) + b) | II.5-9 |
| M.99 | a) + b) | II.5-10 |
| M.100 | a) + b) | II.6-1 |
| M.101 | a) + b) | II.6-2 |
| M.102 | a) + b) | II.6-3 |
| M.103 | a) + b) | II.6-4 |
| M.104 | a) + b) | II.7 |
| M.105 | a) + b) | II.8 |
| M.106 | a) + b) | II.9 |
| M.107 | a) + b) | II.10 |
| M.108 | a) + b) | II.11 |

In another embodiment, the invention relates to mixtures wherein compound I is compound a) of formula I) and compound II is chlorfenapyr. In another embodiment, the invention relates to mixtures wherein compound I is compound b) of formula II) and compound II is chlorfenapyr.

In another embodiment, the invention relates to mixtures wherein compound I is a mixture comprising compound a) of formula I) and compound b) of formula Ia) and compound II is chlorfenapyr.

In another embodiment, the invention relates to mixtures wherein compound I is compound a) of formula I) and compound II is afidopyropen. In another embodiment, the invention relates to mixtures wherein compound I is compound b) of formula Ia) and compound II is afidopyropen.

In another embodiment, the invention relates to mixtures wherein compound I is a mixture comprising compound a) of formula I) and compound b) of formula Ia) and compound II is afidopyropen.

Additional Mixing Partners

The mixtures of the present invention may be combined and applied in agriculture in mixture with further active ingredients, for example with other pesticides, insecticides, nematicides, fungicides, herbicides, safeners, fertilizers such as ammonium nitrate, urea, potash, and superphosphate, phytotoxicants and plant growth regulators.

These mixtures are also embraced by the term "mixture(s) of the present invention" or "mixture(s) according to the invention".

These additional ingredients may be used sequentially or in combination with the mixtures of the invention, if appropriate also added only immediately prior to use (tank mix). For example, the plant(s) may be sprayed with a mixture of this invention either before or after being treated with other active ingredients.

Mixing partners can be selected from pesticides, in particular insecticides, nematicides, and acaricides, fungicides, herbicides, plant growth regulators, fertilizers, and the like. Preferred mixing partners are insecticides, nematicides and fungicides.

In one embodiment, the invention relates to ternary mixtures, comprising a compound I, a compound II and one further compound III, which is not identical to the compound I or II already present in the mixture.

In one embodiment, the invention relates to 4-way mixtures, comprising a compound I, a compound II and two further compounds III, which are not identical to the compound I or II already present in the mixture.

In one embodiment, the invention relates to 5-way mixtures, comprising a compound I, a compound II and three further compounds III, which are not identical to the compound I or II already present in the mixture.

Formulations

The invention also relates to agrochemical compositions comprising an auxiliary and at least one mixture of the present invention.

An agrochemical composition comprises a pesticidally effective amount of a mixture of the present invention. The term "pesticidally effective amount" is defined below.

The mixtures of the present invention can be converted into customary types of agro-chemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers, and binders.

Suitable solvents and liquid carriers are water and organic solvents, such as mineral oil fractions of medium to high boiling point, e.g. kerosene, diesel oil; oils of vegetable or animal origin;

aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclo-hexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol eth-oxylates. Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the mixtures of the present invention on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazoli-nones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-soluble concentrates (SL, LS)

10-60 wt % of a compound I or II or a mixture according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.

ii) Dispersible concentrates (DC)

5-25 wt % of a compound I or II or a mixture according to the invention and 1-10 wt % dispersant (e. g. polyvinylpyrrolidone) are dissolved in up to 100 wt % organic solvent (e.g. cyclohexanone). Dilution with water gives a dispersion.

iii) Emulsifiable concentrates (EC)

15-70 wt % of a compound I or II or a mixture according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)

5-40 wt % of a compound I or II or a mixture according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of a compound I, preferably compound a) of formula (I), or II or a mixture according to the invention are comminuted with addition of 2-10 wt % dispersants and wetting agents (e.g. sodium lignosulfonate and alcohol ethoxylate), 0,1-2 wt % thickener (e.g. xanthan gum) and up to 100 wt % water to give a fine active substance suspension. Dilution with water gives a stable suspension of the active substance. For FS type composition up to 40 wt % binder (e.g. polyvinylalcohol) is added.

vi) Water-dispersible granules and water-soluble granules (WG, SG)

50-80 wt % of a compound I, preferably compound a) of formula (I), or II or a mixture according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-dispersible powders and water-soluble powders (WP, SP, WS)

50-80 wt % of a compound I, preferably compound a) of formula (I), or II or a mixture according to the invention are ground in a rotor-stator mill with ad-dition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dis-persion or solution of the active substance.

viii) Gel (GW, GF)

In an agitated ball mill, 5-25 wt % of a compound I, preferably compound a) of formula (I), or II or a mixture according to the invention are comminuted with addition of 3-10 wt % dispersants (e.g. sodium lignosulfonate), 1-5 wt % thickener (e.g. car-boxymethylcellulose) and up to 100 wt % water to give a fine suspension of the active substance. Dilution with water gives a stable suspension of the active substance.

ix) Microemulsion (ME)

5-20 wt % of a compound I, preferably compound a) of formula (I), or II or a mixture according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermo-dynamically stable microemulsion.

x) Microcapsules (CS)

An oil phase comprising 5-50 wt % of a compound I, preferably compound a) of formula (I), or II or a mixture according to the invention, 0-40 wt % water insoluble organic solvent (e.g. aromatic hydrocarbon), 2-15 wt % acrylic monomers (e.g. methylmethacrylate, methacrylic acid and a dior triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I, preferably compound a) of formula (I), or II according to the invention, 0-40 wt % water insoluble organic solvent (e.g. aromatic hydrocarbon), and an isocyanate monomer (e.g. diphenylme-thene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsule. The monomers amount to 1-10 wt %. The wt % relate to the total CS composition.

xi) Dustable powders (DP, DS)

1-10 wt % of a compound I, preferably compound a) of formula (I), or II or a mixture according to the invention are ground finely and mixed intimately with up to 100 wt % solid carrier, e.g. finely divided kaolin.

xii) Granules (GR, FG)

0.5-30 wt % of a compound I, preferably compound a) of formula (I), or II or a mixture according to the invention is ground finely and associated with up to 100 wt % solid carrier (e.g. silicate). Granulation is achieved by extrusion, spray-drying or the fluidized bed.

xiii) Ultra-low volume liquids (UL)

1-50 wt % of a compound I, preferably compound a) of formula (I), or II or a mixture according to the invention are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and most preferably between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

In a further embodiment, either individual components of the composition according to the invention or partially premixed components, e. g. components comprising mixtures of the present invention, may be mixed by the user in a spray tank and further auxiliaries and additives may be added, if appropriate.

In a further embodiment, either individual components of the composition according to the invention or partially premixed components, e. g. components comprising mixtures of the present invention, can be applied jointly (e.g. after tank mix) or consecutively.

Application Methods

The mixtures of the present invention are suitable for use in protecting crops, plants, plant propagation materials, such as seeds, or soil or water, in which the plants are growing, from attack or infestation by animal pests. Therefore, the present invention also relates to a plant protection method, which comprises contacting crops, plants, plant propagation materials, such as seeds, or soil or water, in which the plants are growing, to be protected from attack or infestation by animal pests, with a pesticidally effective amount of a mixture of the present invention.

The mixtures of the present invention are also suitable for use in combating or controlling animal pests. Therefore, the present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of a mixture of the present invention.

The mixtures of the present invention are effective through both contact and ingestion. Furthermore, the mixtures of the present invention can be applied to any and all developmental stages, such as egg, larva, pupa, and adult.

The mixtures of the present invention can be applied as such or in form of compositions comprising them as defined above. Furthermore, the mixtures of the present invention can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active mixture to the furrow, and closing the furrow. Foliar application refers to the application of the pesticidally active mixture to plant foliage, e.g. through spray equipment. For foliar applications, it can be advantageous to modify the behavior of the pests by use of pheromones in combination with the mixtures of the present invention. Suitable pheromones for specific crops and pests are known to a skilled person and publicly available from databases of pheromones and semiochemicals, such as http://www.pherobase.com.

As used herein, the term "contacting" includes both direct contact (applying the mixtures/compositions directly on the animal pest or plant—typically to the foliage, stem or roots of the plant) and indirect contact (applying the mixtures/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "plant" is to be understood as including wild type plants and plants, which have been modified by either conventional breeding, or mutagenesis or genetic engineering, or by a combination thereof, in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, in-creased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes. Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione.

Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicies: bxn, for tolerance to sulfonylurea herbicides: zm-hra, csr1-2, gm-hra, S4-HrA, for tolerance to ALS inhibitor herbicides: csr1-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHG0JG, HCEM485, VCO-001981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHT0H2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants. In particular genes coding for protease inhibitors, like CpTI and pinII. A further approach uses transgenes in order to produce double stranded RNA in plants to target and down-regulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Cultivated plants comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-00410-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCropDatabase), as well as in patent applications, like EP3028573 and WO2017/011288.

The use of compositions according to the invention on cultivated plants may result in effects which are specific to a cultivated plant comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, mycoplasma, viral or viroid pathogens as well as early vigour, early or delayed ripening, cold or heat tolerance as well as changed amino acid or fatty acid spectrum or content.

It has surprisingly been found that the pesticidal activity of the mixtures of the present invention may be enhanced by the insecticidal trait of a modified plant. Furthermore, it has been found that the mixtures of the present invention are suitable for preventing insects to become resistant to the insecticidal trait or for combating pests, which already have become resistant to the insecticidal trait of a modified plant. Moreover, the mixtures of the present invention are suitable for combating pests, against which the insecticidal trait is not effective, so that a complementary insecticidal activity can advantageously be used.

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection compound or mixture either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The mixtures of the present invention are particularly suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a mixture of the present invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active mixture is carried out by spraying or by dusting the seeds before sowing of the plants and before emergence of the plants.

The present invention also comprises seeds coated with or containing the mixture(s) of the present invention. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, Brassica species, melons, beans, peas, garlic, onions, carrots, tuberous plants such as potatoes, sugar cane, tobacco, grapes, petunias, geranium/pelargoniums, pansies and impatiens.

In addition, the mixture(s) of the present invention may also be used for the treatment of seeds from plants, which have been modified by mutagenisis or genetic engineering, and which e.g. tolerate the action of herbicides or fungicides or insecticides. Such modified plants have been described in detail above.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the mixtures of the present invention for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight. In the treatment of seed, the application rates of the mixtures of the invention are generally from 0.1 g to 10 kg per 100 kg of seed, preferably from 1 g to 5 kg per 100 kg of seed, more preferably from 1 g to 1000 g per 100 kg of seed and in particular from 1 g to 200 g per 100 kg of seed, e.g. from 1 g to 100 g or from 5 g to 100 g per 100 kg of seed.

The invention therefore also relates to seed comprising a mixture of the present invention, or an agriculturally useful salt thereof, as defined herein. The amount of the mixture of the present invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The mixtures of the present invention may also be used for improving the health of a plant. Therefore, the present invention also relates to a method for improving plant health by treating a plant, plant propagation material and/or the locus where the plant is growing or is to grow with an effective and non-phytotoxic amount of a mixture of the present invention.

As used herein "an effective and non-phytotoxic amount" means that the mixture is used in a quantity which allows to obtain the desired effect but which does not give rise to any phytotoxic symptom on the treated plant or on the plant grown from the treated propagule or treated soil. The terms "plant" and "plant propagation material" are defined above.

"Plant health" is defined as a condition of the plant and/or its products which is determined by several aspects alone or in combination with each other such as yield (for example increased biomass and/or increased content of valuable ingredients), quality (for example improved content or composition of certain ingredients or shelf life), plant vigour (for example improved plant growth and/or greener leaves ("greening effect"), tolerance to abiotic (for example drought) and/or biotic stress (for example disease) and production efficiency (for example, harvesting efficiency, processability).

The above identified indicators for the health condition of a plant may be interdependent and may result from each other. Each indicator is defined in the art and can be determined by methods known to a skilled person.

The mixtures of the invention are also suitable for use against non-crop insect pests. For use against said non-crop pests, mixtures of the present invention can be used as bait composition, gel, general insect spray, aerosol, as ultra-low volume application and bed net (impregnated or surface applied). Furthermore, drenching and rodding methods can be used.

As used herein, the term "non-crop insect pest" refers to pests, which are particularly relevant for non-crop targets, such as ants, termites, wasps, flies, ticks, mosquitos, crickets, or cockroaches.

The bait can be a liquid, a solid or a semisolid preparation (e.g. a gel). The bait employed in the composition is a product, which is sufficiently attractive to incite insects such as ants, termites, wasps, flies, mosquitos, crickets etc. or cockroaches to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature (e.g. http://www.pherobase.com), and are known to those skilled in the art.

For use in bait compositions, the typical content of active ingredient is from 0.001 weight % to 15 weight %, desirably from 0.001 weight % to 5% weight % of mixture(s) of the present invention.

Formulations of the mixtures of the present invention as aerosols (e.g. in spray cans), oil sprays or pump sprays are highly suitable for the non-professional user for controlling pests such as flies, fleas, ticks, mosquitos or cockroaches. Aerosol recipes are preferably composed of the active compounds or mixtures of the present invention, solvents, furthermore auxiliaries such as emulsifiers, perfume oils, if appropriate stabilizers, and, if required, propellants.

The oil spray formulations differ from the aerosol recipes in that no propellants are used.

For use in spray compositions, the content of active ingredient is from 0.001 to 80 weights %, preferably from 0.01 to 50 weight % and most preferably from 0.01 to 15 weight %.

The mixtures of the present invention and its respective compositions can also be used in mosquito and fumigating coils, smoke cartridges, vaporizer plates or long-term vaporizers and also in moth papers, moth pads or other heat-independent vaporizer systems.

Methods to control infectious diseases transmitted by insects (e.g. malaria, dengue and yellow fever, lymphatic filariasis, and leishmaniasis) with mixtures of the present invention and its respective compositions also comprise treating surfaces of huts and houses, air spraying and impregnation of curtains, tents, clothing items, bed nets, tsetse-fly trap or the like. Insecticidal compositions for application to fibers, fabric, knit goods, nonwovens, netting material or foils and tarpaulins preferably comprise a mixture including the insecticide, optionally a repellent and at least one binder.

The mixtures of the present invention and their compositions can be used for protecting wooden materials such as trees, board fences, sleepers, frames, artistic artifacts, etc. and buildings, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.001 g to 2000 g or from 0.01 g to 1000 g of active mixture per m² treated material, desirably from 0.1 g to 50 g per m².

Insecticidal compositions for use in the impregnation of materials typically contain from 0.001 to 95 weight %, preferably from 0.1 to 45 weight %, and more preferably from 1 to 25 weight % of at least one repellent and/or insecticide.

Pests

The mixtures of the present invention are especially suitable for efficiently combating animal pests such as arthropods, gastropods and nematodes including but not limited to: insects from the order of Lepidoptera, for example *Achroia grisella, Acleris* spp. such as *A. fimbriana, A. gloverana, A. variana; Acrolepiopsis assectella, Acronicta major, Adoxophyes* spp. *such as A. cyrtosema, A. orana; Aedia leucomelas, Agrotis* spp. such as *A. exclamationis, A. fucosa, A. ipsilon, A. orthogoma, A. segetum, A. subterranea; Alabama argillacea, Aleurodicus dispersus, Alsophila pometaria, Ampelophaga rubiginosa, Amyelois transitella, Anacampsis sarcitella, Anagasta kuehniella, Anarsia lineatella, Anisota senatoria, Antheraea pernyi, Anticarsia* (=*Thermesia*) spp. such as *A. gemmatalis; Apamea* spp., *Aproaerema modicella, Archips* spp. *such as A. argyrospila, A. fuscocupreanus, A. rosana, A. xyloseanus; Argyresthia conjugella. Argyroploce* spp., *Argyrotaenia* spp. such as *A. velutinana; Athetis mindara, Austroasca viridigrisea, Aulographa gamma. Autographa nigrisigna, Baratbra brassicae, Bedellia* spp., *Bonagota salubricola, Borbo cinnara, Bucculatrix thurberiella, Bupalus piniarius, Busseola* spp., *Cacoecia* spp. *such as C. murinana, C. podana; Cactoblastis cactorum, Cadra cautella, Calingo braziliensis, Caloptilis theivora, Capua reticulana, Carposina* spp. such as *C. niponensis, C. sasakii; Cephus* spp., *Chaetocnema aridula, Cheimatobia brumata, Chilo* spp. such as *C. Indicus, C. suppressalis, C. partellus; Choreutis pariana, Choristoneura* spp. such as *C. conflictana, C. fumiferana, C. longicellana, C. murinana, C. occidentalis, C. rosaceana; Chrysodeixis* (=*Pseudoplusia*) spp. such as *C. eriosoma, C. includens; Cirphis unipuncta, Clysia ambiguella, Cnaphalocerus* spp., *Cnaphalocrocis medinalis, Cnephasia* spp., *Cochylis hospes, Coleophora* spp., *Colias eurytheme, Conopomorpha* spp., *Conotrachelus* spp., *Copitarsia* spp., *Corcyra cephalonica, Crambus caliginosellus, Crambus teterrellus, Crocidosema* (=*Epinotia*) *aporema, Cydalima* (=*Diaphania*) *perspectalis, Cydia* (=*Carpocapsa*) spp. such as *C. pomonella, C. latiferreana; Dalaca noctuides, Datana integerrima, Dasycbira pinicola, Dendrolimus* spp. such as *D. pini, D. spectabilis, D. sibiricus; Desmia funeralis, Diaphania* spp. such as *D. nitidalis, D. hyalinala; Diatraea grandiosella, Diatraea saccharalis, Diphthera festiva. Earias* spp. such as *E. insulana, E. vittella; Ecdytotopha aurantianu, Egira* (=*Xylomyges*) *curialis, Elasmopalpus lignosellus, Eldana saccharina, Endopiza viteana, Ennomos subsignaria, Eoreuma loftini, Ephestia* spp. such as *E. cautella, E. elulella, E. kuehniella; Epinotia aporema, Epiphyas postviltana, Erannis tiliaria, Erionota thrax, Etiella* spp., *Eulia* spp., *Eupoecilia ambiguella, Euproctis chrysorrhoea, Euxoa* spp., *Evetria bouliana, Faronta albilinea, Felia* spp. such as *F. subterranean; Galleria mellonella, Gracillaria* spp., *Grapholita* spp. such as *G. funebrana, G. molesta, G. inopinata; Halysidota* spp., *Harrisina americana, Hedylepta* spp. *Helicoverpa* spp. such as *H. armigera* (=*Heliothis armigera*), *H. zea* (=*Heliothis zea*); *Heliothis* spp. such as *H. assulta, H. subffexa, H. virescens; Hellula* spp. such as *H. undalis, H. rogatalis; Helocoverpa gelotopoeon, Hemileuca oliviae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria fiscellaria, Lambdina fiscellaria lugubrosa, Lamprosema indicata, Laspeyresia molesta, Leguminivora glycinivorella, Lerodea eufala, Leucinodes orbonalis, Leucoma salicis, Leucoptera* spp. such as *L. coffeella, L. scitella; Leuminivora lycinivorella, Lithocoiletis blancardella, Lithophane antennata, Llattia octo* (=*Amyna axis*), *Lobesia botrana, Lophocampa* spp., *Loxagrotis albicosta, Loxostege* spp. such as *L. sticticalis, L. cereralis; Lymantria* spp. such as *L. dispar, L. monacha; Lyonetia clerkella, Lyonetia prunifoliella, Malacosoma* spp. such as *M. americanum, M. californicum, M. constrictum, M. neustria; Mamestra* spp. such as *M. brassicae, M. configurata; Mamstra brassicae, Manduca* spp. *such as M. quinquemaculata, M. sexta; Marasmia* spp, *Marmara* spp., *Maruca testulalis, Megalopyge lanata, Melanchra picta, Melanitis leda, Mocis* spp. such as *M. lapites, M. repanda; Mocis latipes, Monochroa fragariae, Mythimna separata, Nemapogon cloacella, Neoleucinodes elegantalis, Nepytia* spp., *Nymphula* spp., *Oiketicus* spp., *Omiodes indicata, Omphisa anastomosalis, Operophtera brumata, Orgyia pseudotsugata, Oria* spp., *Orthaga thyrsalis, Ostrinia* spp. such as *O. nubilalis; Oulema oryzae, Paleacrita vernata, Panolis flammea, Parnara* spp., *Papaipema nebris, Papilio cresphontes, Paramyelois transitella, Paranthrene regalis, Paysandisia archon, Pectinophora* spp. such as *P. gossypiella; Peridroma saucia, Perileucoptera* spp., such as *P. coffeella; Phalera bucephala, Phryganidia californica, Phthorimaea* spp. such as *P. operculella; Phyllocnistis citrella, Phyllonorycter* spp. such as *P. blancardella, P. crataegella, P. issikii. P. ringoniella; Pieris* spp. such as *P. brassicae, P. rapae, P. napi; Pilocrocis tripunctata, Plathypena scabra, Platynota* spp. such as *P. flavedana, P. idaeusalis, P. stultana; Platyptilia carduidactyla, Plebejus argus, Plodia interpunctella, Plusia* spp, *Plutella maculipennis, Plutella xylostella, Pontia protodica, Prays* spp., *Prodenia* spp., *Proxenus lepigone, Pseudaletia* spp. such as *P. sequax, P. unipuncta; Pyrausta nubilalis, Rachiplusia nu, Richia albicosta, Rhizobius ventralis, Rhyacionia frustrana, Sabulodes aegrotata, Schizura concinna, Schoenobius* spp., *Schreckensteinia festaliella, Scirpophaga* spp. such as *S. incertulas, S. innotata; Scotia segetum, Sesamia* spp. *such as S. inferens, Seudyra subflava, Sitotroga cerealella, Sparganothis pilleriana, Spilonota lechriaspis, S. ocellana, Spodoptera* (=*Lamphygma*) spp. such as *S. cosmoides, S. eridania, S. exigua, S. frugiperda, S. latisfascia, S. littoralis, S. litura, S. omithogalli; Stigmella* spp., *Stomopteryx subsecivella, Strymon bazochii, Sylepta derogata, Synanthedon* spp. such as *S. exitiosa, Tecia solanivora, Telehin licus, Thaumatopoea pityocampa, Thaumatotibia* (=*Cryptophlebia*) *leucotreta, Thaumetopoea pityocampa, Thecla* spp., *Theresimima ampelophaga, Thyrinteina* spp, *Tildenia inconspicuella, Tinea* spp. such as *T. cloacella, T. pellionella; Tineola bisselliella, Tortrix* spp. *such as T. viridana; Trichophaga tapetzella, Trichopiusia* spp. such as *T. ni; Tuta* (=*Scrobipalpula*) *absoluta, Udea* spp. such as *U. rubigalis, U. rubigalis; Virachola* spp., *Yponomeuta padella*, and *Zeiraphera canadensis;* insects from the order of Coleoptera, for example *Acalymma vittatum, Acanthoscehdes obtectus, Adoretus* spp., *Agelastica alni, Agrilus* spp. such as *A. anxius. A. planipen-* nis, A. sinuatus; Agriotes spp. such as A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora spp. such as A. glabripennis; Anthonomus spp. such as A. eugenii, A. grandis, A. pomorum; Anthrenus spp., Aphthona euphoridae, Apion spp., Apogonia spp., Athous haemorrhoidalis, Atomaria spp. such as A. linearis; Attagenus spp., Aulacophora femoralis, Blastophagus piniperda, Blitophaga undata, Bruchidius obtectus, Bruchus spp. such as B. lentis, B. pisorum, B. rufimanus; Byctiscus betulae, Callidiellum rufipenne, Callopislria floridensis, Callosobruchus chinensis, Cameraria ohridella, Cassida nebulosa, Cerotoma trifurcata, Cetonia aurata, Ceuthorhynchus spp. such as C. assimilis, C. napi; Chaetocnema tibialis, Cleonus mendicus, Conoderus spp. such as C. vespertinus; Conotrachelus nenuphar, Cosmopolites spp., Costelytra zealandica, Crioceris asparagi, Cryptolestes ferrugineus, Cryptorhynchus lapathi, Ctenicera spp. such as C. destructor; Curculio spp., Cylindrocopturus spp., Cyclocephala spp., Dactylispa balyi, Dectes texanus, Dermestes spp., Diabrotica spp, such as D. undecimpunctata, D. speciosa, D. longicornis, D. semipunctata, D. virgifera; Diaprepes abbreviates, Dichocrocis spp., Diciadispa armigera, Diloboderus abderus, Diocalandra frumenti (Diocalandra stigmaticollis), Enaphalodes rufulus, Epilachna spp. such as S. varivestis, E. vigintioctomaculata; Epitrix spp. such as E. hirtipennis, E. similaris; Eutheoia humilis, Eutinobothrus brasiliensis, Faustinus cubae, Gibbium psylloides, Gnathocerus cornutus, Hellula undalis, Heteronychus arator, Hylamorpba elegans, Hylobius abietis, Hylotrupes bajulus, Hypera spp. such as H. brunneipennis, H. postica; Hypomeces squamosus, Hypothenemus spp., Ips typographus, Lachnosterna consanguinea. Lasioderma serricorne, Latheticus oryzae, Lathridius spp., Lema spp. such as L. bilineata, L melanopus; Leptinotarsa spp. such as L. decemlineata; Leptispa pygmaea, Limonius californicus, Lissorhoptrus oryzophilus, Lixus spp., Luperodes spp., Lyctus spp. such as L. bruneus; Liogenys fuscus, Macrodactylus spp. such as M. subspinosus; Maladera matrida, Megaplatypus mutates, Megascelis spp., Melanotus communis, Meligethes spp. such as M. aeneus; Melolontha spp. such as M. hippocastani, M. melolontha; Metamasius hemipterus, Microtheca spp., Migdolus spp. such as M. fryanus, Monochamus spp. such as M. alternatus; Naupactus xanthographus, Niptus hololeucus, Oberia brevis, Oemona hirta, Oryctes rhinoceros, Oryzaephilus surinamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon spp. such as P. brassicae, P. cochleariae; Phoracantha recurva, Phyllobius pyri, Phyllopertha horticola, Phyllophaga spp, such as P. helleri; Phyllotreta spp. such as P. chrysocephala, P. nemorum, P. striolata, P. vittula; Phyllopertha horticola, Popillia japonica, Premnotrypes spp., Psacothea hilaris, Psylliodes chrysocephala, Prostephanus truncates, Psylliodes spp., Ptinus spp., Pulga saltona, Rhizopertha dominica, Rhynchophorus spp. such as R. billineatus, R. ferrugineus, R. palmarum, R. phoenicis, R. vulneratus; Saperda candida, Scolytus schevyrewi, Scyphophorus acupunctatus, Sitona lineatus, Sitophilus spp. such as S. granaria, S. oryzae, S. zeamais; Sphenophorus spp. such as S. levis; Stegobium paniceum, Stemechus spp. such as S. subsignatus; Stropho-morphus ctenotus, Symphyletes spp., Tanymecus spp., Tenebrio molitor, Tenebrioides mauretanicus, Tribolium spp. such as T. castaneum; Trogoderma spp., Tychius spp., Xylotrechus spp. such as X. pyrmoderus; and, Zabrus spp. such as Z. tenebrioides;

insects from the order of Diptera for example Aedes spp. such as A. aegypti, A. aibopictus. A. vexans; Anastrepha ludens, Anopheles spp. such as A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia spp. such as C. bezziana, C. hominivorax, C. macellaria; Chrysops atlanticus, Chrysops discalis, Chrysops silacea, Cochliomyia spp. such as C. hominivorax; Contarinia spp. such as C. sorghicola; Cordylobia anthropophaga, Culex spp. such as C. nigripalpus, C. pipiens, C. quinquefasciatus, C. tarsalis, C. tritaeniorhynchus; Culicoides furens, Culiseta inomata, Culiseta melanura, Cuterebra spp., Dacus cucurbilae, Dacus oleae, Dasineura brassicae, Dasineura oxycoccana, Delia spp. such as D. antique, D. coarctata, D. platura, D. radicum; Dermatobia hominis, Drosophila spp. such as D. suzukii, Fannia spp. such as F. canicularis; Gastraphilus spp. such as G. intestinalis; Geomyza lipunctala, Glossina spp. such as G. fuscipes, G. morsitans, G. palpalis, G. tachinoides; Haematobia irritans, Haplodiplosis equeslris, Hippelales spp., Hylemyia spp. such as H. platura; Hypoderma spp. such as H. lineata; Hyppobosca spp., Hydrellia philippina, Leptoconops torrens, Liriomyza spp. such as L. sativae, L. trifolii; Lucilia spp. such as L. caprina. L. cuprina, L. sericata; Lycoria pectoralis, Mansonia titillanus, Mayetiola spp. such as M. destructor; Musca spp. such as M. autumnalis, M. domestica; Muscina stabulans, Oestrus spp. such as O. ovis; Opomyza florum, Oscinella spp. such as O. frit; Orseolia oryzae, Pegomya hysocyami, Phlebotomus argentipes, Phorbia spp. such as P. antiqua, P. brassicae, P. coarctata; Phytomyza gymnostoma, Prosimulium mixtum, Psila rosae, Psorophora columbiae, Psorophora discolor, Rhagoletis spp. such as R. cerasi, R. cingulate, R. indifferens, R. mendax, R. pomonella; Rivellia quadrifasciata, Sarcophaga spp. such as S. haemorrhoidalis; Simulium vittatum, Sitodiptosis mosellana. Stomoxys spp. such as S. calcitrans; Tabanus spp. such as T. atratus, T. bovinus, T. lineol, T. similis; Tannia spp, Thecodiplosis japonensis, Tipula oleracea, Tipula paludosa, and Wohlfahrtia spp;

insects from the order of Thysanoptera for example, Baliothrips biformis, Dichromothrips corbetti, Dichromothrips ssp., Echinothrips americanus, Enneothrips flavens, Frankliniella spp. such as F. fusca, F. occidentalis, F. tritici; Heliothrips spp., Hercinotbrips femoralis, Kakothrips spp., Microcepbalothrips abdominalis, Neobydatothrips samayunkur, Pezotbrips kellyanus, Rhipiphorothrips cruentatus, Scirtothrips spp. such as S. citri, S. dorsalis, S. perseae; Stencbaetotbrips spp. Taeniotbrips cardamoni, Taeniothrips inconsequens, Thrips spp. such as T. imagines, T. hawaiiensis, T. oryzae, T. palmi, T. parvispinus, T. tabaci;

insects from the order of Hemiptera for example, Acizzia jamatonica, Acrosternum spp. such as A. bilare; Acyrthosipon spp. such as A. onobrycbis, A. pisum; Adelges laricis, Adelges tsugae, Adelphocoris spp., such as A. rapidus, A. superbus; Aeneolamia spp., Agonoscena spp., Aulacortbum solani, Aleurocantbus woglumi, Aleurodes spp., Aleurodicus disperses, Aleurolobus barodensis, Aleurothrixus spp., Amrasca spp., Anasa thstis, Antestiopsis spp., Anurapbis cardui, Aonidiella spp., Apbanostigma piri, Apbidula nasturtii, Aphis spp. such as A. craccivora, A. fabae, A. forbesi, A. gossypii, A. grossulariae, A. maidiradicis, A. pomi, A. sambuci, A. schneideri, A. spiraecola; Arboridia apicalis,

*Arilus critatus, Aspidiella* spp., *Aspidiotus* spp., *Atanus* spp., *Aulacaspis yasumatsui, Aulacorthum solani, Bactericera cockerelli (Paratrioza cockerelli), Bemisia* spp. such as *B. argentifolii, B. tabaci (Aleurodes tabaci); Blissus* spp. such as *B. leucopterus; Brachycaudus* spp. such as *B. cardui, B. helichrysi, B. persicae, B. prunicola; Brachycolus* spp., *Brachycorynella asparagi, Brevicoryne brassicae, Cacopsylla* spp. such as *C. fulguralis, C. pyricola (Psylla piri); Calligypona marginata, Calocris* spp., *Campylomma livida, Capitophorus horni, Carneocephala fulgida, Cavelerius* spp., *Ceraplastes* spp., *Ceratovacuna lanigera, Ceroplastes ceriferus, Cerosipha gossypii, Chaetosiphon fragaefolii, Chionaspis tegalensis, Chlorita onukii, Chromaphis juglandicola, Chrysomphalus ficus, Cicadulina mbila, Cimex* spp. such as *C. hemipterus, C. lectularius; Coccomytilus halli, Coccus* spp. such as *C. hesperidum, C. pseudomagnoliarum, Corythucha arcuata, Creontiades dilutus, Cryptomyzus ribis, Chrysomphalus aonidum, Cryptomyzus ribis, Ctenarytaina spatulata, Cyrtopeltis notatus, Dalbulus* spp., *Dasynus piperis, Dialeurodes* spp. such as *D. cilrifolli; Dalbulus maidis, Diaphorina* spp. such as *D. citri; Diaspis* spp, such as *D. bromeliae; Dichelops furcatus, Diconocoris hewetti, Doralis* spp., *Dreyfusia nordmannianae, Dreyfusia piceae. Drosicha* spp., *Dysaphis* spp. such as *D. planlaginea, D. pyri, D. radicola; Dysaulacorthum pseudosolani, Dysdercus* spp. such as *D. cingulalus. D. intermedius; Dysmicoccus* spp., *Edessa* spp., *Geocoris* spp., *Empoasca* spp. such as *E. fabae, E. solana; Epidiaspis leperii, Eriosoma* spp. such as *E. lanigerum, E. pyricola; Erythroneura* spp., *Eurygaster* spp. such as *E. integriceps; Euscelis bilobatus, Euschislus* spp. such as *E. heros, E. impictiventris, E. servus; Fiorinia theae, Geococcus coffeae, Glycaspis brimblecombei, Halyomorpha* spp. such as *H. halys; Heliopeltis* spp., *Homalodisca vilripennis (=H. coagulata), Horcias nobilellus, Hyalopterus pruni, Hyperomyzus lactucae, Icerya* spp. such as *I. purchase; Idiocerus* spp., *Idioscopus* spp., *Laodelphax striatellus, Lecanium* spp., *Lecanoideus floccissimus. Lepidosaphes* spp. such as *L. ulmi; Leptocohsa* spp., *Leptoglossus phyllopus, Lipaphis erysimi, Lygus* spp. such as *L. hesperus, L. lineolaris, L, pratensis; Maconellicoccus hirsutus, Marchalina hellenica, Macropes excavalus, Macrosiphum* spp. such as *M. rosae, M. avenae, M. euphorbiae; Macrosteles quadrilinealus, Mahanarva fimbriolata, Megacopta cribraia, Megoura viciae, Melanaphis pyrarius, Melanaphis sacchari, Melanocallis (=Tinocallis) caryaefoliae, Metcafiella* spp., *Metopolophium dirhodum, Monellia costalis, Monelliopsis pecanis, Myzocallis coryli, Murgantia* spp., *Myzus* spp. such as *M. ascatonlcus, M. cerasi, M. nicotianae, M. persicae, M. varians; Nasonovia ribis-nigri. Neotoxoptera formosana, Neomegalotomus* spp. *Nephotettix* spp. *such as N. malayanus, N. nigropictus, N. parvus, N. virescens; Nezara* spp. such as *N. viridula; Nilaparvata lugens, Nysius huttoni, Oebalus* spp. such as *O. pugnax; Oncometopia* spp., *Orthezia praelonga, Oxycaraenus hyalinipennis, Parabemisia myricae, Parlatoria* spp., *Parthenolecanium* spp. *such as P. corni, P. persicae; Pemphigus* spp. such as *P. bursarius, P. populivenae; Peregrinus maidis, Perkinsiella saccharicida, Phenacoccus* spp. such as *P. aceris, P. gossypii; Phloeomyzus passerinii, Phorodon humuli, Phylloxera* spp. such as *P. devastatrix, Piesma quadrata, Piezodorus* spp. such as *P. guildinii; Pinnaspis aspidistrae, Planococcus* spp. such as *P. citri, P. ficus; Prosapia bicincta, Prolopulvinaria pyriformis, Psallus seriatus, Pseudacysta persea, Pseudaulacaspis pentagona, Pseudococcus* spp. such as *P. comstocki; Psylla* spp. such as *P. mali; Pteromalus* spp., *Pulvinaria amygdali, Pyrilia* spp., *Quadraspidiotus* spp. such as *Q. perniciosus; Quesada gigas, Rastrococcus* spp., *Reduvius senilis, Rhizoecus americanus, Rhodnius* spp., *Rhopalomyzus ascalonicus, Rhopalosiphum* spp. such as *R. pseudobrassicas, R. insertum, R. maidis, R. padi; Sagatodes* spp., *Sahlbergella singularis, Saissetia* spp., *Sappaphis mala, Sappaphis mali, Scaptocoris* spp., *Scaphoides titanus, Schizaphis graminum, Schizoneura lanuginosa, Scotinophora* spp., *Selenaspidus articulatus, Sitoblon avenae, Sogata* spp., *Sogatella furcifera, Solubea insularis, Spissistilus festinus (=Stictocephala festina), Stephanitis nashi, Stephanitis pyrioides, Stephanitis takeyai, Tenalaphara malayensis, Tetraleurodes perseae, Therioaphis maculate, Thyanta* spp., such as *T. accerra, T. perditor; Tibraca* spp., *Tomaspis* spp., *Toxoptera* spp. such as *T. aurantii; Trialeurodes* spp. such as *T. abutilonea, T. ricini, T. vaporariorum; Thatoma* spp., *Trioza* spp., *Typhlocyba* spp., *Unaspis* spp. such as *U. citri, U. yanonensis*; and *Viteus vitifolii.*

Insects from the order Hymenoptera for example *Acanthomyops interjectus, Athalia rosae, Atta* spp. such as *A. capiguara, A. cephalotes, A. cephalotes, A. laevigata, A. robusta, A. sexdens, A. texana, Bombus* spp., *Brachymyrmex* spp., *Camponotus* spp. such as *C. floridanus, C. pennsylvanicus, C. modoc; Cardiocondyla nuda, Chalibion* sp, *Crematogaster* spp., *Dasymutilla occidentalis, Diprion* spp., *Dolichovespula maculata, Dorymyrmex* spp., *Dryocosmus kuriphilus, Formica* spp., *Hoplocampa* spp. such as *H. minuta, H. testudinea; Iridomyrmex humilis, Lasius* spp. such as *L. niger. Linepithema humile, Liometopum* spp., *Leptocybe invasa, Monomorium* spp. *such as M. pharaonis. Monomorium, Nylandria fulva, Pachycondyla chinensis, Paratrechina longicornis, Paravespula* spp., such as *P. germanica, P. pennsylvanica, P. vulgaris; Pheidole* spp. *such as P. megacephala; Pogonomyrmex* spp. such as *P. barbatus, P. californicus, Polistes rubiginosa, Prenolepis impairs, Pseudomyrmex gracilis, Schelipron* spp., *Sirex cyaneus, Solenopsis* spp. *such as S. geminata, S. invicla, S. molesta, S. richleri, S. xyloni, Sphecius speciosus, Sphex* spp., *Tapinoma* spp. such as *T. melanocephalum, T. sessile; Tetramorium* spp. such as *T. caespilum, T. bicarinatum, Vespa* spp. such as *V. crabro; Vespula* spp. such as *V. squamosal; Wasmannia auropunctata, Xylocopa* sp;

Insects from the order Orthoptera for example *Achela domesticus, Calliptamus italicus, Chortoicetes terminifera, Ceulhophilus* spp., *Diaslrammena asynamora, Dociostaurus maroccanus, Gryllotalpa* spp. such as *G. africana, G. gryllotalpa; Gryllus* spp., *Hieroglyphus daganensis, Kraussaria angulifera, Locusta* spp. such as *L. migraloria, L pardalina; Melanoplus* spp. *such as M. bivittatus, M. femurrubrum, M. mexicanus, M. sanguinipes, M. spretus; Nomadacris septemfasciata, Oedaleus senegalensis, Scapteriscus* spp., *Schistocerca* spp. such as *S. americana, S. gregaria, Stemopelmatus* spp., *Tachycines asynamorus,* and *Zonozerus variegatus;*

Pests from the Class Arachnida for example *Acari*, e.g. of the families Argasidae, Ixodidae and Sarcoptidae, such as *Amblyomma* spp. (e.g. *A. americanum, A. variegatum, A. maculalum), Argas* spp. such as *A. persicu), Boophilus* spp. such as *B. annuiatus, B. decoloratus, B. microplus, Dermacentor* spp. such as *D. silvarum, D. andersoni, D. variabilis, Hyalomma* spp. such as *H. truncatum, Ixodes* spp. such as *I. ricinus, I. mbicundus, I scapularis, I. bolocyclus, I. pacificus, Rhipicephalus sanguineus, Ornithodorus* spp. such as *O. moubata, O. hermsi, O. turicata, Ornithonyssus bacoti, Otobius megnini, Dermanyssus gallinae, Psoroptes* spp. such as *P. ovis, Rhipicephalus* spp. such as *R. sanguineus, R. appendiculatus, Rhipicephalus evertsi, Rhizoglyphus* spp., *Sarcoptes* spp. such as *S. Scabier*, and Family Eriophyidae including *Aceria* spp. such as *A. sheldoni*, *A. anthocoptes*, *Acallitus* spp., *Aculops* spp. such as *A. lycopersici*, *A. pelekassi*, *Aculus* spp. such as *A. schlechtendali*; *Colomerus vitis*, *Epitrimerus pyri*, *Phyllocoplruta oleivora*; *Eriophytes ribis* and *Eriophyes* spp. such as *Eriophyes sheldonr*̌, Family Tarsonemidae including *Hemitarsonemus* spp., *Phylonemus pallidas* and *Polyphagotarsonemus latus*, Stenotarsonemus spp. *Steneotarsonemus spinkr*̌, Family Tenuipalpidae including *Brevipalpus* spp. such as *B. phoenicis*, Family Tetranychidae including *Eotelranychus* spp., *Eutetranychus* spp., *Oligonychus* spp., *Petrobia latens*, *Tetranychus* spp. such as *T. cinnabarinus*, *T. evansi*, *T. kanzawai*, *T, pacificus*, *T. phaseulus*, *T. tetanus* and *T. urticae*; *Bryobia praetiosa*; *Panonychus* spp. such as *P. ulmi*, *P. citrr*̌, *Melatetranychus* spp. and *Oligonychus* spp. such as *O. pratensis*, *O. perseae*, *Vasates lycopersicr*̌, *Raoiella indica*, Family Carpoglyphidae including *Carpoglyphus* spp.; *Penthaleidae* spp. such as Halotydeus destructor; Family Demodicidae with species such as *Demodex* spp.; Family Trombicidea including *Trombicula* spp.; Family Macronyssidae including *Ornothonyssus* spp.; Family Pyemotidae including *Pyemotes tritici*̌, *Tyrophagus putrescentiae*; Family Acaridae including *Acarus siro*; Family Araneida including *Latrodectus mactans*, *Tegenaria agrestis*, *Chiracanthium* sp, *Lycosa* sp *Achaearanea tepidariorum* and *Loxosceles reclusa*;

Pests from the Phylum Nematoda, for example, plant parasitic nematodes such as root-knot nematodes. *Meloidogyne* spp. such as *M. hapla*, *M. incognita*, *M. javanica*; cyst-forming nematodes, *Globodera* spp. such as *G. rostochiensis*; *Heterodera* spp. such as *H. avenae*, *H. glycines*, *H. schachtii*, *H. trifolli*; Seed gall nematodes, *Anguina* spp.; Stem and foliar nematodes, *Aphelenchoides* spp. such as *A. besseyi*; Sting nematodes, *Belonolaimus* spp. such as *B. longicaudatus*; Pine nematodes, *Bursaphelenchus* spp. such as *B. lignicolus*, *B. xylophilus*; Ring nematodes, *Criconema* spp., *Criconemella* spp. such as *C. xenopfex* and *C. ornata*; and, *Criconemoides* spp. such as *Criconemoides informis*; *Mesocriconema* spp.; Stem and bulb nematodes, *Ditylenchus* spp. such as *D. destructor*, *D. dipsaci*; Awl nematodes, *Dolichodorus* spp.; Spiral nematodes, *Heliocotylenchus multicinctus*; Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Nacobbus* spp.; Needle nematodes, *Longidorus* spp. such as *L. elongatus*; Lesion nematodes, *Pratylenchus* spp. such as *P. brachyurus*, *P. neglectus*, *P. penetrans*, *P. curvitatus*, *P. goodeyi*; Burrowing nematodes, *Radopholus* spp. such as *R. similis*; *Rhadopholus* spp.; *Rhodopholus* spp.; Reniform nematodes. *Rotylenchus* spp. such as *R. robustus*, *R. reniformis*; *Scutellonema* spp.; Stubby-root nematode, *Trichodorus* spp. such as *T. obtusus*, *T. primitivus*; *Paratrichodorus* spp. such as *P. minor*; Stunt nematodes, *Tylenchorhynchus* spp. such as *T. claytoni*, *T. dubius*; Citrus nematodes, *Tylenchulus* spp. such as *T. semipenetrans*; Dagger nematodes, *Xiphinema* spp.; and other plant parasitic nematode species;

Insects from the order Isoptera for example *Calotermes flavicollis*, *Coptotermes* spp. such as *C. formosanus*, *C. gestroi*, *C. acinaciformis*; *Cornitermes cumulans*, *Cryptotermes* spp. such as *C. brevis*, *C. cavifrons*; *Globitermes sulfureus*, *Heterotermes* spp. such as *H. aureus*, *H. longiceps*, *H. tenuis*; *Leucotermes flavipes*, *Odontotermes* spp, *Incisitermes* spp. such as *I. minor*, *I. snyder*; *Marginitermes hubbardi*, *Mastotemes* spp. such as *M. darwiniensis* *Neocapritermes* spp. such as *N. opacus*, *N. parvus*; *Neotermes* spp., *Procornitermes* spp., *Zootermopsis* spp. such as *Z. angusticollis*, *Z. nevadensis*, *Reticulitermes* spp. such as *R. hesperus*, *R. tibialis*, *R. speratus*, *R. flavipes*. *R. grassei*, *R. lucifugus*, *R. santonensis*, *R. virginicus*; *Termes natalensis*, Insects from the order Blattaria for example *Blatta* spp. such as *B. orientalis*, *B. lateralis*; *Blattella* spp. such as *B. asahinae*, *B. germanica*; *Leucophaea maderae*, *Panchlora nivea*, *Periplaneta* spp. such as *P. americana*, *P. australasiae*, *P. brunnea*, *P. fuligginosa*, *P. japonica*; *Supella longipalpa*, *Parcoblatta pennsylvanica*, *Eurycotis floridana*, *Pycnoscelus surinamensis*.

Insects from the order Siphonoptera for example *Cediopsylla simples*, *Ceratophyllus* spp., *Ctenocephalides* spp. such as *C. felis*, *C. canis*. *Xenopsylla cheopis*, *Pulex irritans*, *Trichodectes canys*, *Tunga penetrans*, and *Nosopsyllus fasciatus*.

Insects from the order Thysanura for example *Lepisma sacchanna*, *Ctenolepisma urbana*, and *Thermobia domestica*.

Pests from the class Chilopoda for example *Geophilus* spp., *Scutigera* spp. such as *Scutigera coleoptrata*;

Pests from the class Diplopoda for example *Blaniulus guttulatus*, *Julus* spp., *Narceus* spp., Pests from the class Symphyla for example *Scutigerella immaculata*.

Insects from the order Dermaptera, for example *Forficula auricularia*.

Insects from the order Collembola, for example *Onychiurus* spp., such as *Onychiurus armatus*.

Pests from the order Isopoda for example, *Armadillidium vulgare*, *Oniscus asellus*, *Porcellio scaber*.

Insects from the order Phthiraptera, for example *Damalinia* spp., *Pediculus* spp. such as *Pediculus humanus capitis*, *Pediculus humanus corporis*, *Pediculus humanus humanus*; *Pthirus pubis*, *Haematopinus* spp. such as *Haematopinus eurysternus*, *Haematopinus suis*; *Linognathus* spp. such as *Linognathus vituli*; *Bovicola bovis*, *Menopon gallinae*, *Menacanthus stramineus* and *Solenopotes capillatus*, *Trichodectes* spp., Examples of further pest species which may be controlled by the mixture(s) of the present invention include: from the Phylum Mollusca, class Bivalvia, for example, *Dreissena* spp. class Gastropoda, for example, *Arion* spp., *Biomphalaria* spp., *Bulinus* spp., *Deroceras* spp., *Galba* spp., *Lymnaea* spp., *Oncomelania* spp., *Pomacea caniliclata*, *Succinea* spp.; from the class of the helminths, for example, *Ancylostoma duodenale*, *Ancylostoma ceylanicum*, *Acylostoma braziliensis*, *Ancylostoma* spp., *Ascaris lubricoides*. *Ascaris* spp., *Brugia malayi*, *Brugia timori*, *Bunostomum* spp., *Chabertia* spp., *Clonorchis* spp., *Cooperia* spp., *Dicrocoelium* spp., *Dictyocaulus filaria*, *Diphyllobothrium latum*, *Dracunculus medinensis*, *Echinococcus granulosus*, *Echinococcus multilocularis*, *Enterobius vermicularis*, *Faciola* spp., *Haemonchus* spp. such as *Haemonchus contortus*; *Heterakis* spp., *Hymenolepis nana*, *Hyostrongulus* spp., *Loa Loa*, *Nematodirus* spp., *Oesophagostomum* spp., *Opistorchis* spp., *Onchocerca volvulu*, *Ostertagia* spp., *Paragonimus* spp., *Schistosomen* spp., *Strongyloides fuelleborni*, *Strongyloides stercora lis*, *Stronyloides* spp., *Taenia saginata*, *Taenia solium*, *Thchinella spiralis*, *Trichinella nativa*, *Trichinella britovi*, *Trichinella nelsoni*, *Trichinella pseudopsiralis*, *Trichostrongulus* spp, *Trichuris trichuria*, *Wuchereria bancrofti*.

B. Biology

Synergism can be described as an interaction where the combined effect of two or more compounds is greater than the sum of the individual effects of each of the compounds.

The presence of a synergistic effect in terms of percent control, between two mixing partners (X and Y) can be calculated using the Colby equation (Colby, S. R., 1967, Calculating Synergistic and Antagonistic Responses in Herbicide Combinations, Weeds, 15, 20-22):

$$E = X + Y - \frac{XY}{100}$$

When the observed combined control effect is greater than the expected combined control effect (E), then the combined effect is synergistic.

The following tests demonstrate the control efficacy of compounds, mixtures or compositions of this invention on specific pests. However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests.

The analysis of synergism or antagonism between the mixtures or compositions was determined using Colby's equation.

BIOLOGICAL EXAMPLES

In the following compound a) is compound a) of formula (I) (broflanilide).

B.1 Vetch Aphid (*Megoura viciae*)

For evaluating control of vetch aphid (*Megoura viciae*) through contact or systemic means the test unit consisted of 24-well-microtiter plates containing broad bean leaf disks. The compounds or mixtures were formulated using a solution containing 75% by weight water and 25% by weight DMSO. Different concentrations of formulated compounds or mixtures were sprayed onto the leaf disks at 2.5 µl, using a custom built micro atomizer, at two replications.

For experimental mixtures in these tests identical volumes of both mixing partners at the desired concentrations respectively, were mixed together.

After application, the leaf disks were air-dried and 5-8 adult aphids placed on the leaf disks inside the microtiter plate wells. The aphids were then allowed to suck on the treated leaf disks and incubated at 23+1° C., 50+5% RH for 5 days. Aphid mortality and fecundity was then visually assessed. For the mixtures tested the results are listed in table 1.

TABLE 1

| Compound (s) used | ppm | Average Control % |
|---|---|---|
| II.1 | 0.8 | 0 |
| a) | 0.8 | 50 |
| II.1 + a) | 0.8 + 0.8 | 100* |
| II.6-2 | 5 | 25 |
| a) | 0.8 | 25 |
| II.6-2 + a) | 5 + 0.8 | 100* |
| II.3-1 | 10 | 50 |
| a) | 0.08 | 0 |
| II.3-1 + a) | 10 + 0.08 | 100* |

*synergistic control effect according to Colby's equation

B.2 Green Peach Aphid (*Myzus persicae*)

For evaluating control of green peach aphid (*Myzus persicae*) through systemic means the test unit consisted of 96-well-microtiter plates containing liquid artificial diet under an artificial membrane.

The compounds or mixtures were formulated using a solution containing 75% by weight water and 25% by weight DMSO. Different concentrations of formulated compounds or mixtures were pipetted into the aphid diet, using a custom built pipetter, at two replications.

For experimental mixtures in these tests identical volumes of both mixing partners at the desired concentrations respectively were mixed together.

After application, 5-8 adult aphids were placed on the artificial membrane inside the microtiter plate wells. The aphids were then allowed to suck on the treated aphid diet and incubated at 23±1° C., 50±5% RH for 3 days. Aphid mortality and fecundity was then visually assessed. For the mixtures tested the results are listed in table 2.

TABLE 2

| Compound(s) used | ppm | Average Control % |
|---|---|---|
| II.4-1 | 2 | 0 |
| a) | 0.8 | 25 |
| II.4-1 + a) | 2 + 0.8 | 75* |
| II.3-1 | 10 | 37.5 |
| a) | 0.08 | 0 |
| II.3-1 + a) | 10 + 0.08 | 100* |

*synergistic control effect according to Colby's equation

B.3 Boll Weevil (*Anthonomus grandis*)

For evaluating control of boll weevil (*Anthonomus grandis*) the test unit consisted of 24-well-microtiter plates containing an insect diet and 20-30 *A. grandis* eggs.

The compounds or mixtures were formulated using a solution containing 75% by weight water and 25% by weight DMSO. Different concentrations of formulated compounds or mixtures were sprayed onto the insect diet at 20 µl, using a custom built micro atomizer, at two replications. For experimental mixtures in these tests identical volumes of both mixing partners at the desired concentrations respectively, were mixed together.

After application, microtiter plates were incubated at 23±1° C., 50±5% RH for 5 days. Egg and larval mortality was then visually assessed. For the mixtures tested the results are listed in table 3.

TABLE 3

| Compound(s) used | ppm | Average (Control %) |
|---|---|---|
| II.3-1 | 50 | 25 |
| a) | 0.08 | 25 |
| II.3-1 + a) | 50 + 0.08 | 87.5* |

*synergistic control effect according to Colby's equation

B.4 Tobacco Budworm (*Heliothis virescens*)

For evaluating control of tobacco budworm (*Heliothis virescens*) the test unit consisted of 96-well-microtiter plates containing an insect diet and 15-25 *H. virescens* eggs.

The compounds or mixtures were formulated using a solution containing 75% by weight water and 25% by weight DMSO. Different concentrations of formulated compounds or mixtures were sprayed onto the insect diet at 10 µl, using a custom built micro atomizer, at two replications.

For experimental mixtures in these tests identical volumes of both mixing partners at the desired concentrations respectively, were mixed together.

After application, microtiter plates were incubated at 28±1° C., 80±5% RH for 5 days. Egg and larval mortality was then visually assessed. For the mixtures tested the results are listed in table 4.

TABLE 4

| Compound(s) used | ppm | Average (Control %) |
|---|---|---|
| II.4-1 | 0.08 | 0 |
| a) | 0.8 | 0 |
| II.4-1 + a) | 0.08 + 0.8 | 75* |

*synergistic control effect according to Colby's equation

B.5 Greenhouse Whitefly (*Trialeurodes vaporariorum*)

For evaluating control of Greenhouse Whitefly (*Trialeurodes vaporariorum*) the test unit consisted of 96-well-microtiter plates containing a leaf disk of egg plant leaf disk with white fly eggs. The compounds or mixtures were formulated using a solution containing 75% by weight water and 25% by weight DMSO. Different concentrations of formulated compounds or mixtures were sprayed onto the insect diet at 2.5 µl, using a custom built micro atomizer, at two replications. For experimental mixtures in these tests identical volumes of both mixing partners at the desired concentrations respectively, were mixed together.

After application, microtiter plates were incubated at 23±1° C., 65±5% RH for 6 days. Mortality of hatched crawlers was then visually assessed. For the mixture tested the results are listed in Table 5.

TABLE 5

| Greenhouse Whitefly | ppm | Average (Control %) |
|---|---|---|
| II.3-1 | 2 + 0 | 25 |
| a) | 0 + 0.4 | 0 |
| II.3-1 + a) | 2 + 0.4 | 62.5* |

*synergistic control effect according to Colby's equation

The invention claimed is:

1. Pesticidal mixtures comprising as active compounds
1) at least one compound I selected from
   a) compound a) of formula (I)

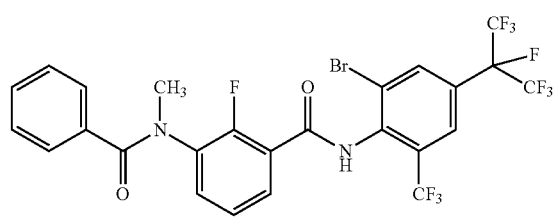

(I)

b) compound b) of formula (Ia)

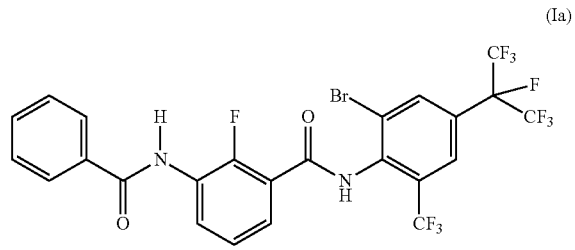

(Ia)

c) mixtures comprising compounds a) and b),
or the tautomers, enantiomers, diastereomers, or salts thereof,
and
2) one or more pesticidally active compounds II selected from the group of
2.1. a compound selected from the compound of formula II.1, compound II.7 and compound II.8:

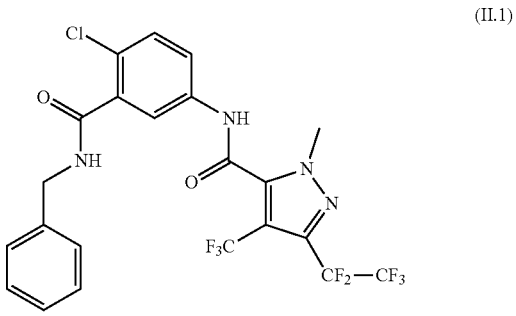

(II.1)

compound II.7 N-[4-chloro-3-(cyclopropylcarbamoyl)phenyl]-2-methyl-5-(1,1,2,2,2-pentafluoroethyl)-4-(trifluoromethyl)pyrazole-3-carboxamide;
compound II.8 N-[4-chloro-3-[(1-cyanocyclopropyl)carbamoyl]phenyl]-2-methyl-5-(1,1,2,2,2-pentafluoroethyl)-4-(trifluoromethyl)pyrazole-3-carboxamide;
2.2. a compound of formula II.2

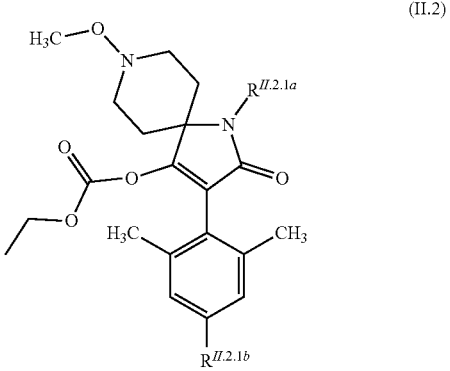

(II.2)

| | $R^{II.2.1a}$ | $R^{II.2.1b}$ |
|---|---|---|
| II.2-1 | H | CH$_3$ |
| II.2-2 | H | Cl |
| II.2-3 | CH$_3$ | Cl |
| II.2-4 | CH$_3$ | CH$_3$ |
| II.2-5 | O—CH$_2$CH$_3$ | CH$_3$ |

-continued
| II.2-6 | O—CH₃ | CH₃ |
| II.2-7 | O—CH₃ | Cl |
| II.2-8 | O—CH₂CH₃ | Cl |
2.3. a compound of formula II.3-1 or II.3-2
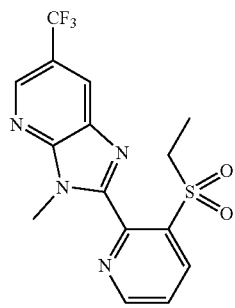
(II.3-1)
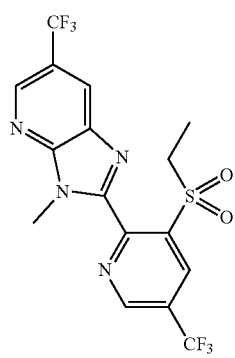
(II.3-2)
2.4. a compound of formula II.4-1 or II-4.2
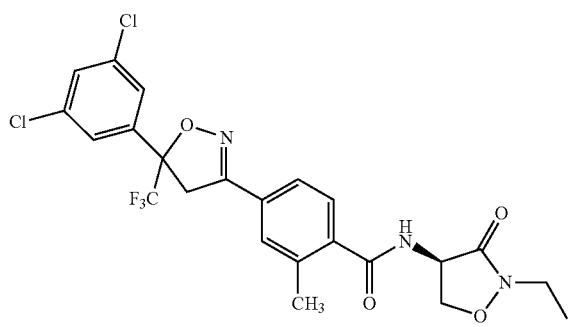
(II.4-1)
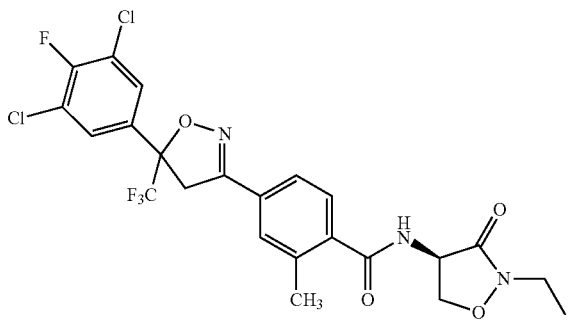
(II.4-2)
2.5. a compound of formula II.5
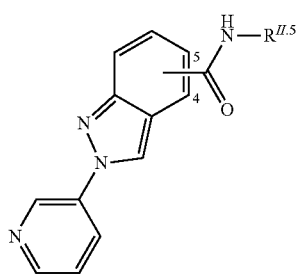
(II.5)
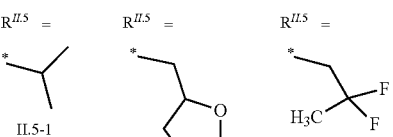
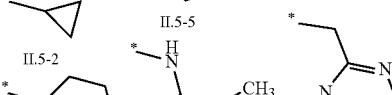
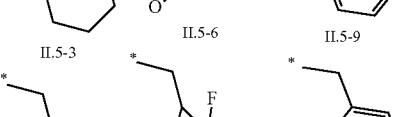
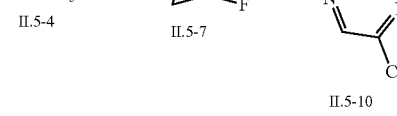
wherein the moiety —C(O)NHR$^{II.5}$ in compounds II.5-1 to II.5-4 is connected to position 4 of the indazole moiety and wherein the moiety —C(O)NHR$^{II.5}$ in compounds II.5-5 to II.5-10 is connected to position 5 of the indazole moiety;

2.6. a compound of formula II.6

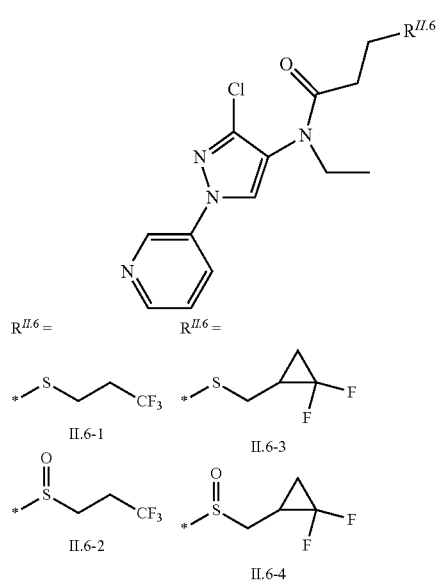

2.7. compound II.9 acynonapyr;
2.8. compound II.10 benzpyrimoxan;
2.9. compound II.11 2-chloro-N-(1-cyanocyclopropyl)-5-[1-[2-methyl-5-(1,1,2,2,2-pentafluoroethyl)-4-(trifluoromethyl)pyrazol-3-yl]pyrazol-4-yl]benzamide;
in a pesticidally effective amount, and the weight ratio of compound I and compound II is from 1000:1 to 1:1000.

2. Pesticidal mixtures according to claim 1, wherein the compound II is the compound II.1, II.2-1, II.2-2, II.2-3, II.2-4, II.2-5, II.2-6, II.2-7, II.2-8, II.3-1, II.3-2 or II.4-1, II.4-2, II.4-1S, II.4-1R, II.4-2S or II.4-2R.

3. Pesticidal mixtures according to claim 1, wherein the compound I is compound a) of formula (I).

4. Pesticidal mixtures according to claim 1, wherein the compound I is compound b) of formula (Ia).

5. Pesticidal mixtures according to claim 1, wherein the compound of formula I is a mixture of compound a) and compound b).

6. Pesticidal mixtures according to claim 1, wherein the compound II is a compound selected from the compound of formula II.1, compound II.7 and compound II.8:

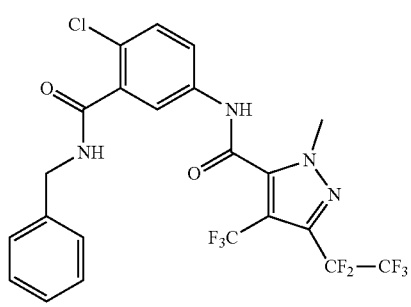

compound II.7 N-[4-chloro-3-(cyclopropylcarbamoyl)phenyl]-2-methyl-5-(1,1,2,2,2-pentafluoroethyl)-4-(trifluoromethyl)pyrazole-3-carboxamide;

compound II.8 N-[4-chloro-3-[(1-cyanocyclopropyl)carbamoyl]phenyl]-2-methyl-5-(1,1,2,2,2-pentafluoroethyl)-4-(trifluoromethyl)pyrazole-3-carboxamide.

7. Pesticidal mixtures according to claim 1, wherein the compound II is the compound of formula II.1.

8. Pesticidal mixtures according to claim 1, wherein the compound II is the compound of formula II.4-1 or II.4-2:

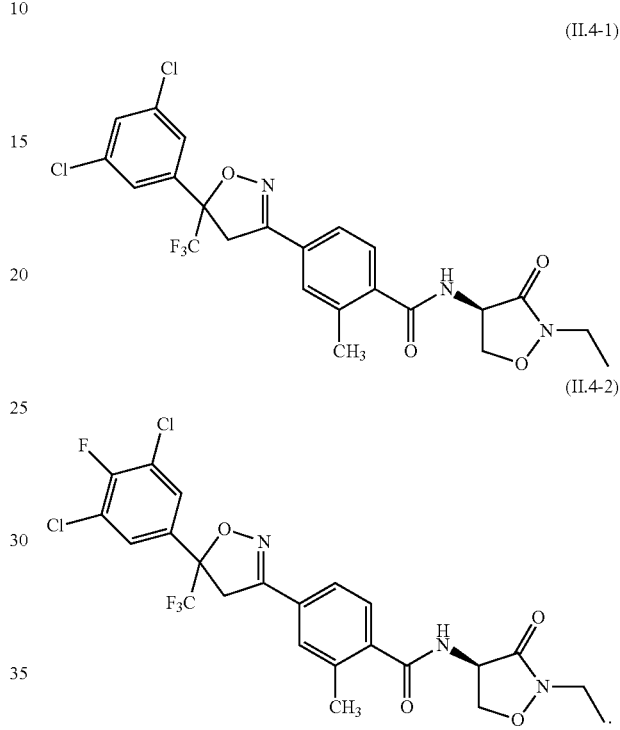

9. The pesticidal mixture of claim 1, for use in treating soil, furrows, dwelling places or nests, wherein the pesticidal mixture is applied in an amount from 0.0001 g to 500 g per 100 m².

10. The pesticidal mixture of claim 1, for use in treating crop plants, wherein the pesticidal mixture is applied in an amount from 0.0001 g to 4000 g per hectare.

11. Pesticidal mixtures according to claim 1, wherein the mixture of compound I and compound II comprises at least one further pesticide that is compound III, an insecticide that is not identical to the compound I or II already present in the mixture.

12. A method for controlling insects, acarids or nematodes comprising contacting an insect, acarid or nematode or their food supply, habitat, breeding grounds or their locus with a mixture according to claim 11 in pesticidally effective amounts.

13. A method of protecting plants from attack or infestation by insects, acarids or nematodes comprising contacting the plant, or the soil or water in which the plant is growing, with a pesticidally effective amount of a mixture according to claim 11.

14. A method for protection of plant propagation material comprising contacting the plant propagation material with a mixture as defined in claim 11 in pesticidally effective amounts.

15. Seed, comprising the mixture according to claim 11 in an amount of from 0.1 g to 10 kg per 100 kg of seeds.

16. A pesticidal composition, comprising a liquid or solid carrier and a mixture according to claim 11.

* * * * *